(12) United States Patent
Pannullo

(10) Patent No.: US 11,957,120 B2
(45) Date of Patent: Apr. 16, 2024

(54) TORCH SYSTEM WITH PREDICTIVE CONTROL OF AUTOMATIC FUEL REPLENISHMENT

(71) Applicant: Joseph Pannullo, Essex Fells, NJ (US)

(72) Inventor: Joseph Pannullo, Essex Fells, NJ (US)

( * ) Notice: Subject to any disclaimer, the term of this patent is extended or adjusted under 35 U.S.C. 154(b) by 0 days.

(21) Appl. No.: 18/355,542

(22) Filed: Jul. 20, 2023

(65) Prior Publication Data

US 2024/0016140 A1 Jan. 18, 2024

Related U.S. Application Data

(63) Continuation-in-part of application No. 17/023,986, filed on Sep. 17, 2020, now Pat. No. 11,342,298,
(Continued)

(51) Int. Cl.
*F23D 3/28* (2006.01)
*A01M 29/12* (2011.01)
(Continued)

(52) U.S. Cl.
CPC .............. *A01M 29/12* (2013.01); *F23D 3/28* (2013.01); *F23D 3/30* (2013.01); *F23K 5/06* (2013.01);
(Continued)

(58) Field of Classification Search
CPC ..... F23K 5/14; F23K 5/06; F23D 3/28; F23D 3/30; F23D 3/32
See application file for complete search history.

(56) References Cited

U.S. PATENT DOCUMENTS 52,618 A 2/1866 Stansell
143,143 A 9/1873 Hallas
(Continued)

FOREIGN PATENT DOCUMENTS

CN 111380043 A * 7/2020
CN 111380043 A 7/2020
(Continued)

OTHER PUBLICATIONS

Office Actions for U.S. Appl. No. 16/928,767, dated Sep. 11, 2020, 29 Pages.
(Continued)

*Primary Examiner* — Jorge A Pereiro
(74) *Attorney, Agent, or Firm* — Maine Cernota & Curran

(57) ABSTRACT

Torches are automatically refilled with a liquid fuel from a central reservoir pumped via a plumbing system, without directly monitoring local torch fuel levels. Instead, each torch includes a passive fuel overfill prevention valve. When refueling, the pump operates until all torches are filled. Refueling can cease after a set time, or when sensors report a backpressure and/or cessation of fuel flow. Pre-calibration establishes torch burning rates and/or maximum refill time. Time between refueling is predicted, based upon total burning time, which can be measured by torch heat sensors or determined according to a usage schedule or direct control of torch ignition and extinguishing by the controller. Reverse pumping can extinguish the torches, and wick ignitors can relight them sequentially. A service provider can monitor fuel consumption, establish a pattern of usage, and supply fuel in time to replenish the central reservoir, and/or other provide maintenance as needed.

20 Claims, 16 Drawing Sheets

Related U.S. Application Data which is a continuation of application No. 17/023,957, filed on Sep. 17, 2020, now abandoned, which is a continuation-in-part of application No. 16/928,767, filed on Jul. 14, 2020, now Pat. No. 10,842,146.

(51) Int. Cl.
*F23D 3/30* (2006.01)
*F23K 5/06* (2006.01)
*F23K 5/14* (2006.01)

(52) U.S. Cl.
CPC ............ *F23K 5/14* (2013.01); *F23D 2202/00* (2013.01); *F23D 2900/31012* (2021.05); *F23D 2900/31014* (2021.05)

(56) References Cited

U.S. PATENT DOCUMENTS

| | | | |
|---|---|---|---|
| RE6,844 E | 1/1876 | Ambrose | |
| 252,195 A | 1/1882 | Decker | |
| 262,804 A | 8/1882 | Marichenski | |
| 372,020 A | 10/1887 | Hardcastle | |
| 418,113 A | 12/1889 | Marzo | |
| 594,264 A | 11/1897 | Miller | |
| 771,567 A | 10/1904 | O'Brien | |
| 826,423 A | 7/1906 | Haden | |
| 945,569 A | 1/1910 | Millea | |
| 1,142,816 A | 6/1915 | Kaufman | |
| 1,161,745 A | 11/1915 | Springman | |
| 1,259,791 A | 3/1918 | Simmons | |
| 1,310,560 A | 7/1919 | Cook | |
| 1,349,267 A | 8/1920 | Craig | |
| 1,391,956 A | 9/1921 | Henry | |
| 1,442,228 A | 1/1923 | La Salle | |
| 1,763,164 A | 6/1930 | Lavigne | |
| 1,790,480 A | 1/1931 | Macomber | |
| 1,905,918 A | 4/1933 | Lennmor | |
| 2,197,686 A | 4/1940 | Flutsch | |
| 2,210,751 A | 8/1940 | Cronkhite | |
| 2,276,039 A | 3/1942 | Horther | |
| 2,481,491 A * | 9/1949 | Bishop | F23K 5/06 137/565.29 |
| 2,495,230 A | 1/1950 | Day et al. | |
| 2,499,118 A * | 2/1950 | Sipes | F21V 35/00 431/87 |
| 2,604,113 A | 7/1952 | Barsano | |
| 3,028,100 A * | 4/1962 | Russo | A45D 34/04 239/47 |
| 3,802,464 A * | 4/1974 | Frank | F16L 55/052 138/30 |
| 3,817,686 A | 6/1974 | Quittner | |
| 4,193,417 A | 3/1980 | Bowman | |
| 4,417,870 A | 11/1983 | Nakamura | |
| 4,470,433 A | 9/1984 | Vipond | |
| 4,477,247 A * | 10/1984 | Kumasaka | F21L 17/00 431/146 |
| 4,582,478 A | 4/1986 | Hilker | |
| 4,667,278 A | 5/1987 | Poyer | |
| 4,835,663 A * | 5/1989 | Abbott | F21S 13/00 362/159 |
| 4,847,192 A | 7/1989 | Fujimoto | |
| 4,974,134 A | 11/1990 | Bourne | |
| 5,057,005 A | 10/1991 | Kwok | |
| 5,263,794 A | 11/1993 | Webb | |
| 5,297,896 A | 3/1994 | Webb | |
| 5,472,340 A | 12/1995 | Lynch | |
| 5,540,250 A | 7/1996 | Mullins | |
| 5,932,842 A | 8/1999 | Eberl | |
| 5,980,238 A | 11/1999 | Collins, Sr. | |
| 6,006,773 A | 12/1999 | Bravo | |
| 6,159,002 A * | 12/2000 | LeJeune | F23D 3/34 431/324 |
| 6,370,738 B1 | 4/2002 | Dion, Jr. | |
| 6,579,090 B1 * | 6/2003 | Taubitz | F23D 3/24 431/126 |
| 6,746,235 B1 * | 6/2004 | Aszenbrenner | F23D 3/24 431/125 |
| 8,191,932 B2 | 6/2012 | Davis | |
| 8,390,981 B1 | 3/2013 | Treadaway | |
| 8,435,029 B2 | 5/2013 | Masterson et al. | |
| 8,678,045 B1 * | 3/2014 | Jorge | F23Q 2/52 141/2 |
| 8,823,714 B1 | 9/2014 | Thielvoldt | |
| 9,228,739 B2 * | 1/2016 | Barudi | F23D 5/04 |
| 9,249,897 B2 | 2/2016 | Acosta | |
| 9,267,681 B2 | 2/2016 | Barudi et al. | |
| 9,810,426 B2 | 11/2017 | Bauswell et al. | |
| 10,317,077 B2 | 6/2019 | Hansen et al. | |
| 10,378,754 B1 * | 8/2019 | Durrence | F21V 37/0054 |
| 10,393,379 B2 * | 8/2019 | Lev | F23D 3/16 |
| 10,485,367 B2 | 11/2019 | Kopolowitz | |
| 10,842,146 B1 | 11/2020 | Pannullo | |
| 11,209,160 B2 * | 12/2021 | Wu | F23D 3/02 |
| 11,266,141 B1 * | 3/2022 | Chojnacki | A01M 29/10 |
| 2002/0146656 A1 | 10/2002 | Thigpen | |
| 2002/0164554 A1 * | 11/2002 | Kisch | F23D 3/02 431/298 |
| 2003/0036030 A1 * | 2/2003 | Doppelt | F23D 3/30 431/316 |
| 2005/0104371 A1 | 5/2005 | Atkinson | |
| 2006/0134571 A1 | 6/2006 | St-Germain | |
| 2007/0160944 A1 * | 7/2007 | Knight | F23Q 3/006 431/278 |
| 2011/0198550 A1 * | 8/2011 | Howard | F21S 13/10 431/328 |
| 2011/0198551 A1 * | 8/2011 | Howard | F23D 3/18 431/344 |
| 2012/0258412 A1 * | 10/2012 | Jackow | F23D 14/60 431/254 |
| 2012/0282559 A1 | 11/2012 | Barudi et al. | |
| 2013/0027918 A1 * | 1/2013 | White | F21S 19/00 362/249.02 |
| 2013/0101946 A1 | 4/2013 | Masterson et al. | |
| 2013/0114244 A1 | 5/2013 | Formico | |
| 2013/0149651 A1 | 6/2013 | Thielvoldt | |
| 2014/0134546 A1 | 5/2014 | Masterson et al. | |
| 2014/0255857 A1 * | 9/2014 | Barudi | F23D 5/00 431/12 |
| 2014/0362560 A1 * | 12/2014 | Formico | F21V 15/01 239/302 |
| 2014/0366262 A1 | 12/2014 | Flynn | |
| 2014/0371927 A1 * | 12/2014 | Pooladsanj | G05D 7/0617 700/282 |
| 2015/0047627 A1 | 2/2015 | Thielvoldt | |
| 2015/0144713 A1 * | 5/2015 | Formico | A01M 1/2044 239/289 |
| 2016/0113094 A1 | 4/2016 | Wagner et al. | |
| 2016/0286627 A1 | 9/2016 | Chen et al. | |
| 2017/0059155 A1 * | 3/2017 | Fendler | F23D 3/18 |
| 2017/0254532 A1 | 9/2017 | Bauswell | |
| 2017/0268775 A1 | 9/2017 | Lev | |
| 2018/0072965 A1 | 3/2018 | Han | |
| 2019/0117816 A1 * | 4/2019 | Dycher | A61L 9/037 |
| 2019/0242577 A1 * | 8/2019 | Mann | G06F 3/167 |
| 2020/0003412 A1 | 1/2020 | Bianchini | |
| 2021/0071855 A1 | 3/2021 | Pan | |

FOREIGN PATENT DOCUMENTS

| | | |
|---|---|---|
| EP | 0096111 A2 | 12/1983 |
| JP | 63201422 A | 8/1988 |
| JP | 2003343837 A | 5/2002 |
| JP | 2006289266 A | 10/2006 |
| JP | 2011046287 A2 | 4/2011 |

OTHER PUBLICATIONS

Notice of Allowance for U.S. Appl. No. 16/928,767, dated Oct. 2, 2020, 5 Pages.

(56) References Cited

OTHER PUBLICATIONS

Office Action for U.S. Appl. No. 17/138,322, dated Mar. 2, 2021, 6 Pages.
Office Action for U.S. Appl. No. 17/138,322, dated Mar. 30, 2021, 21 Pages.
International Search Report and Written Opinion for PCT Appl. No. PCT/US2020/062120, dated Apr. 15, 2021, 15 Pages.
Final Office Action for U.S. Appl. No. 17/138,322 dated Jun. 17, 2021, 27 pages.
Advisory Office Action for U.S. Appl. No. 17/138,322, dated Aug. 27, 2021, 4 Pages.
Office Action for U.S. Appl. No. 17/138,322, dated Sep. 24, 2021, 20 Pages.
Final Office Action for U.S. Appl. No. 17/138,322 dated Mar. 15, 2022, 21 pages.
International Search Report and Written Opinion for PCT Appl. No. PCT/US2022/013950, dated May 4, 2022, 13 pages.
Office Action for U.S. Appl. No. 17/585,463 dated May 10, 2022, 15 pages.
Notice of Allowance for U.S. Appl. No. 17/585,463, dated Jun. 23, 2022, 12 Pages.
Advisory Office Action for U.S. Appl. No. 17/138,322, dated Jul. 28, 2022, 3 pages.
Office Action for U.S. Appl. No. 17/023,957 dated Aug. 4, 2022, 49 pages.
Notice of Allowance for Patent Appl. No. 17/752,152 dated Aug. 19, 2022, 24 pages.
Notice of Allowance for U.S. Appl. No. 17/138,322 dated Oct. 13, 2022, 27 Pages.
Final Office Action for U.S. Appl. No. 17/023,957 dated Dec. 6, 2022, 31 pages.
International Preliminary Report on Patentability for PCT Appl. No. PCT/US2020/062120, dated Jan. 26, 2023, 10 Pages.
Office Action for U.S. Appl. No. 18/073,986 dated Mar. 14, 2023, 40 pages.
Office Action for U.S. Appl. No. 17/023,957 dated Mar. 24, 2023, 27 pages.
International Preliminary Report on Patentability for International Application No. PCT/US2022/013950 dated Aug. 10, 2023, 9 pages.

* cited by examiner

TORCH SYSTEM WITH PREDICTIVE CONTROL OF AUTOMATIC FUEL REPLENISHMENT

RELATED APPLICATIONS

This application is a continuation in part of application Ser. No. 17/023,986, filed on Dec. 2, 2022. Application Ser. No. 17/023,986 is a bypass application (continuation) of international application PCT/US20/62120, filed Nov. 25, 2020, which is a continuation in part of U.S. application Ser. No. 16/928,767, filed Jul. 14, 2020, now U.S. Pat. No. 10,842,146, and is also a continuation in part of U.S. application Ser. No. 17/023,957, filed Sep. 17, 2020. Application Ser. No. 17/023,986 is also a continuation of U.S. application Ser. No. 17/023,957, filed Sep. 17, 2020. Application Ser. No. 17/023,957 is a continuation in part of U.S. application Ser. No. 16/928,767, filed Jul. 14, 2020, now U.S. Pat. No. 10,842,146. This application is also a U.S. bypass application (continuation) of international application PCT/US22/13950, filed Jan. 26, 2022, which claims the benefit of U.S. Provisional Application No. 63/142,225, filed Jan. 27, 2021 and also claims the benefit of U.S. Provisional Application No. 63/208,811, filed on Jun. 9, 2021. Each of these applications is herein incorporated by reference in its entirety for all purposes.

FIELD OF THE INVENTION

The invention relates to liquid fuel burning torches, including liquid fuel burning torches that provide natural firelight and/or repel insects by burning a fuel that contains an insect repellant substance.

BACKGROUND OF THE INVENTION

The enjoyment of outdoor activities during periods of warm weather has always been highly popular, and it is often desirable for an outdoor activity to extend into hours after dark, in which case lighting of some sort is needed. One possibility is to provide conventional electric lights, but often this approach does not provide an optimal ambiance. Instead, some outdoor venues, such as patio venues at hotels, resorts, etc., provide gas fueled torches that are interlinked by a gas plumbing system and permanently installed in areas where outdoor evening activities are hosted. This approach has the advantage that the torches can all be easily extinguished simply by shutting off the supply of gas to the gas pipes included in the gas plumbing system.

However, gas-fueled torches can be expensive to operate. Also, gas-fueled torches can pose a safety hazard, in that any leakage of gas could be highly dangerous if it is somehow ignited. For example, if sufficient leaked gas accumulates in the vicinity of a burning torch, and then is ignited by the torch, the result can be an explosive burst of flame.

Also, installation of a gas plumbing system typically requires employment of a licensed plumber, in addition to municipal permitting and connection of the gas plumbing system to a gas utility hookup. In some regions, such as arid areas and dry forested locations, gas torches can greatly increase the risk of wild fires in areas where dead leaves and/or other dried vegetation is present. As a result, many local ordinances discourage the installation of gas pipelines, such that it can be difficult to obtain the required permits to install and operate outdoor gas torches, especially when a large quantity of interlinked gas torches are to be installed.

Furthermore, outdoor activities are often hindered by the prevalence of insect pests, which can include swarming insects such as gnats, as well as biting insects such as black flies and mosquitos. In fact, mosquitos are the greatest menace for spreading diseases like dengue, malaria, yellow fever, zika, West Nile, and many others, causing millions of deaths each year. More than 35% of the world population lives in an area where the risk of diseases such as dengue is high.

According to the recent statistics of the US CDC (Centre for Disease Control and Prevention) published in the year 2019, the incidence of dengue, has risen by 30 times in the past 30 years, worldwide. The report also states that the parasite disease called lymphatic filariasis that is transmitted by repeated mosquito bites over a period of a few months affects more than 120 million people in approximately 72 different countries.

One approach is to apply an insect repellent directly to the skin. However, this approach is sometimes undesirable, because of the residue that remains on the skin after the outdoor activity has concluded, as well as concerns regarding toxicity that might be absorbed by the skin, and a reluctance to spend time applying the repellant and subsequently washing the repellant off again. Furthermore, repellants applied to the skin may fail to provide adequate protection from insects, for example if there is an inadvertent failure to apply the repellant to certain skin regions. Furthermore, some insects, such as mosquitos, are frequently able to bite a victim through clothing, or on the scalp through hair or at a location where the hair is parted and the underlying scalp is exposed.

Many outdoor activities, such as barbecues, take place in relatively limited areas, such as on a deck or patio, or in a limited region that has been set aside specifically for such activities. One approach in such cases is to spray the area with an insecticide or repellant before the activity begins. Systems exist that provide permanently installed insecticide misting jets fed from a central tank of insecticide, intended for periodic, automated misting of an outdoor area with insecticide. However, insecticides are toxic and noxious, and are therefore limited to application when an outdoor area is not in use. Furthermore, insecticides can leave a toxic residue on tables, chairs, and other surfaces, and are mainly effective at the time of application, because they lose most of their ability to kill pests as they disburse and dry. To the extent that pesticides may have any long-term effectiveness, that benefit is lost if the pesticide residue is washed away by rain or by lawn irrigation. For that reason, some pesticide systems include an option for a user to invoke spray on-demand for increased effectiveness during high pest periods, and/or to re-apply the pesticide after rainfall or lawn irrigation. In addition, the application of pesticides in large quantities can be harmful to the environment.

Another approach is to surround an activity area with devices that attract and electrocute insects, in the hope that any approaching insects will be lured away and destroyed before they reach the outdoor activity area. However, this approach can backfire, in that the luring features of these devices can draw additional insects to the activity area, such that even though some insects are intercepted, a large number of others continue past the devices and enter the activity area.

With reference to FIG. 1, another, somewhat more effective method for repelling insects from an outdoor activity area 100 is to surround the area 100 with torches 102 that burn a fuel that is mixed with an insect repellant such as citronella. Often, the torches are supported on poles that are simply inserted into the ground. The torches can be permanently mounted, for example set into a cement slab, removably insertable into holes provided in an underlying hard surface, or supported by removable stands 104, which can be filled with sand or water to increase weight and stability.

As the fuel is burned in the torches 102, the repellant is continuously vaporized and disbursed throughout the activity area 100, thereby continuing to repel insects away from the area 100 for as long as the torches 102 continue to burn. Furthermore, if an activity takes place, or continues, after sunset, the light from the torches 102 can be an esthetically attractive feature. For these reasons, so-called "Tiki" torches 102 are very frequently used to repel mosquitos, fireflies, insects, and other pests. In particular, tiki torches 102 are highly preferred for repelling mosquitos.

However, such torches 102 typically have small fuel reservoirs, which can become exhausted before an outdoor activity has ended. While tiki torches 102 can typically be refilled, most cannot be safely refilled while in use, nor can they be safely refilled after use until they have cooled to a temperature that is near ambient. Furthermore, the need to manually light, extinguish, and re-fill the torches places a stringent limit on their height, so as to enable users to perform these tasks without the help of a ladder. As a result, the torches are typically positioned at the height of an average user, which poses a danger to users of an outdoor activity area, who may inadvertently approach too close to a burning torch and be burned. This danger is significantly increased for activities that include the serving of alcoholic beverages. For these and other reasons, this approach is not practical when regular, repeated use of a plurality of torches is required.

As the use of liquid fuel burning torches continues to increase, not only by individuals but also by establishments such as hotels, restaurants, and resorts, it would be desirable for the torches to continue burning fuel over long periods of time. However, for larger establishments such as large restaurants, hotels, and travel resorts, it can be inconvenient and expensive to re-fill and/or exchange a large number of liquid fuel burning torches several times over the course of a day and evening, as they repeatedly exhaust their local fuel supplies.

What is needed, therefore, is a liquid fuel burning torch system that can maintain the burning of a plurality of torches for extended periods of time without user maintenance.

SUMMARY OF THE INVENTION

The present invention is a liquid fuel burning torch system that can maintain the burning of a plurality of torches for extended periods of time without user maintenance.

A recently introduced approach according to U.S. Pat. Nos. 10,842,146, 11,503,822, 11,428,343, and 11,492,200, as well as co-pending U.S. patent application Ser. Nos. 17/023,957 and 18/073,986 and international applications PCT/US20/62120 and PCT/US22/13950 (all of which are by the present Applicant and all of which are incorporated herein by reference in their entirety for all purposes), provides an automatic refueling system that can refuel any desired number of liquid fuel burning torches as needed by pumping liquid fuel from a central reservoir through a fuel plumbing system to the torches. According to this approach, a large number of torches can continue burning almost indefinitely.

A controller can be included in the refueling system to provide automated torch re-filling as needed. In some implementations, as is taught for example in U.S. Pat. No. 10,842,146, each torch includes at least one level sensor and a remotely controlled valve, both of which are in wired or wireless communication with the controller, whereby the controller is able to monitor the fuel level in each torch and operate the pump and the local valves to refill each torch as needed. Some previously disclosed automatic torch refueling systems further include automated torch ignition, and various torch refueling systems include automatic extinguishing of the torches by reversing the flow direction of the fuel in the system and withdrawing the fuel from the torches, such that the torches are extinguished once the fuel in their wicks has been exhausted.

While these approaches can be effective, the need for separate, electronically controlled valves and level sensors in each torch, as well as wired or wireless interconnection from the sensors and valves to the controller, greatly increases the cost and complexity of the system, and also increases the number of electronic components that can fail, which can lead to added expense as well as safety concerns.

U.S. Pat. No. 11,1428,343, discloses a passive, automatic fuel overfill prevention valve that can be included in the torches to substantially eliminate the danger of overfilling a torch and spilling its fuel, for example if the level sensor or controller fails. The valves are small and inexpensive, are entirely mechanical, and do not require intercommunication with the controller. By implementing these passive overfill prevention valves in the torches, the need for each torch to include a remotely controlled electronic valve can be eliminated. Instead, the controller can simply pressurize the fuel within the plumbing system whenever at least one of the torches is nearly empty, and all of the torches will be refilled. However, it remains necessary for each of the torches to include a level sensor so that the controller can determine when to activate the pump.

As an alternative, the level sensors can also be omitted from the torches, and instead the controller can simply maintain the fuel within the plumbing system at a pressure above ambient whenever the torches are being used, thereby causing the passive valves to remain perpetually in a partially open state, and ensuring that the torches remain filled at all times. However, this approach does not allow the local reservoirs in the torches to drain before they are refilled, but instead requires a continuous flow of fuel into the torches as the fuel is consumed.

The fuel pressure within the plumbing system can be maintained by frequently or continuously activating the pump. However, this approach can lead to wasted energy and early pump failure. As an alternative, a gas-filled (e.g. air-filled) ballast can be provided in pressure communication with the plumbing system, whereby the pump can be intermittently operated to raise the pressure within the plumbing system to a maximum level, after which the pressure will decrease gradually over time due to the compressible gas in the ballast, until a minimum pressure, still above ambient, is reached within the plumbing system. However, a gas-filled pressure ballast adds cost and complexity to the system, decreases system reliability, and significantly compromises and complicates refilling of the central reservoir, especially while the torches are in operation.

Furthermore, while these recently introduced approaches enable the torches to burn for longer periods of time, periodic refilling of the central reservoir is still required, which places a significant scheduling and logistical burden on the operator of the torches to ensure that the reservoir is consistently refueled before the fuel supply is exhausted, especially for commercial establishments such as hotels and resorts that depend on regular, and perhaps daily, use of the torches.

Accordingly, the present invention is a liquid fuel burning torch system and method of use thereof that can maintain the burning of a plurality of torches for extended periods of time with little or no user maintenance, without requiring that the torches include fuel level sensors and/or remotely controlled electronic valves, and without requiring that fuel be perpetually maintained at a pressure above ambient within the fuel plumbing system. Embodiments further eliminate any need for the torch operator to track fuel reserves, and to pre-order and provide fuel in advance of periodic refilling of the central reservoir.

More specifically, the present invention is a system that includes at least one liquid fuel-burning torch in combination with an automatic refueling system that refuels the torch or torches as needed by pumping liquid fuel from a central reservoir through a fuel plumbing system to the local fuel reservoirs of each of the torches, so that the torches can continue burning almost indefinitely. In embodiments, the central reservoir can be refilled with liquid fuel while the torches are in operation. The torches do not include remotely controlled electronic valves. Instead, each of the torches includes a passive fuel overfill prevention valve (FOP) that is mechanically activated by the level of liquid fuel in the internal reservoir to automatically close when the fuel in the internal reservoir reaches a defined level, thereby preventing further fuel from entering the internal reservoir. The FOP can be a valve as disclosed in U.S. Pat. No. 11,1428,343. Accordingly, it is not necessary to separately characterize or monitor each of the torches. According to the disclosed method, whenever at least one of the torches needs to be refilled, all of them are refilled.

Furthermore, the torches do not include remotely monitored fuel level sensors. Nor does the present invention require that fuel pressure be maintained in the fuel plumbing system at all times. Instead, the controller is configured to implement a predictive method of determining when to activate the pump and thereby refill the torches. In embodiments, this predictive method is directed to estimating the minimum amount of burning time $Tr$ that is required to consume a defined percentage of the fuel contained within the local fuel reservoir of a single torch. The time $Tr$ is also referred to herein as the "refill" time for the system, in that it represents the time that will elapse after a refilling of the torches 200 before they will need to be refilled again. Because the torches operate independently between refills, $Tr$ will be a property of each individual torch, depending on the capacity and shape of its local fuel reservoir and the configuration of the FOP valve, as well as the composition of the fuel being burned, and can be determined upon initial installation of the system. If the torches are not all identical to each other in terms of how long they can burn between refills, then $Tr$ can be defined as the minimum amount of burning time that will elapse before at least one of the torches has consumed the defined percentage of its local fuel supply.

Once $Tr$ has been determined, the pump can be activated whenever the burning time for the torches reaches $Tr$. As a simple example, if the torches are operated according to a fixed schedule, for example the torches are ignited at 7:00 PM and extinguished at midnight, and if the initial calibration determines that 80% of the fuel in each torch will be consumed every hour while they are burning ($Tr=1$ hour), then the controller can be configured to turn on the pump at 7:00 PM, and again at the top of each subsequent hour until midnight. This approach does not necessarily require that the torches are operated according to a fixed schedule, so long as the controller is made aware each time that usage of the system is initiated and terminated, so that the total burning time can be calculated. This will automatically be the case if the torches are ignited by instructing the controller to activate electronic wick ignitors that are provided with the torches, and extinguished by instructing the controller to reverse the pumping direction of the system, so that the fuel is pumped out of the local reservoirs of the torches.

In some embodiments, a time required to refill all of the torches is established by pre-calibration during initial installation of the system. The calibration can be performed when the system is entirely empty of fuel, and can include filling the central fuel reservoir, activating the pump, and then recording the time that elapses until all of the torches are filled. This time, referred to herein as $Te$, establishes a maximum time required to refill the torches in the system, even when the entire system, including the plumbing, is empty of fuel. In other embodiments, the torches are filled and then allowed to burn without refilling until they are all extinguished due to lack of fuel. At this point, the time required to refill all of the torches is measured. This time, referred to herein as $Tm$, represents the time required to fill the torches themselves when the torches are empty but the plumbing system is filled with fuel. Due to the inclusion of the FOP valves in the torches, it is not necessary to monitor the levels of fuel in the local reservoirs of the torches. It is only necessary to operate the pump for a time $Tm$ to ensure that all of the torches will be filled and all of the FOP valves will be closed. In some of these embodiments, a total refill cycle consists of alternately operating the pump for a time $Tm$, and then allowing the torches to burn for a time $Tr$, without any requirement to apply any sensors to the system.

In other embodiments, the fuel pressure within the fuel plumbing system is monitored by a pressure sensor that is in communication with the controller, and/or the flow of fuel within the fuel plumbing system is monitored by a fuel flow sensor that is in communication with the controller. Preferably, the fuel flow sensor is installed at a location within the fuel plumbing system through which fuel flowing from the central reservoir to any of the torches must pass.

Including at least one of these sensors allows the controller to detect when all of the torches have been filled and all of the passive FOP valves have closed, because when all of the FOP valves have closed, the sensors will detect a backpressure in the fuel plumbing system and/or a cessation of fuel flow within the fuel plumbing system. Accordingly, when refilling the torches, the pump, in these embodiments, will be allowed to operate. A refilling cycle in these embodiments can consist of allowing the torches to burn for a time $Tr$, and then operating the pump until the measured backpressure and/or fuel flow indicates that all of the local FOP valves have closed, and all of the torches are full.

Some of these embodiments include determining the maximum fill time $Tm$ by initial calibration, as described above, so that $Tm$ can be used to detect system failures. Specifically, if the pump continues to operate for a time that significantly exceeds $Tm$, and yet no backpressure or cessation of fuel flow is detected, the controller will conclude that one of the FOP valves has failed, or some other leak or failure has occurred in a torch or in the fuel plumbing system, and will stop the pump or reverse the pumping direction to minimize any spillage of excess fuel.

In various embodiments that monitor the pressure and/or the flow rate of the fuel in the fuel plumbing system, the controller is able to detect changes in the average rate of fuel consumption by the torches, for example due to changes in the composition of the fuel being used, changes in the wind conditions, or adjustments made to the wicks, by taking note of the actual amount of fill time Tf that is required to fill all of the torches. This is because changes in Tf will indicate changes in the amount of remaining fuel at the end of Tr. In these embodiments, the controller is able to adjust Tr to ensure that a desired margin of fuel is retained in the torches at all times.

In some embodiments, the controller is not necessarily able to determine when the torches are burning and when they are not. In some of these embodiments, the pump is activated by the controller at the end of each time period Tr, regardless of whether or not the torches are burning. If the torches are not burning, and the internal reservoirs of the torches are already full, then the FOP valves remain closed, and the pumping has no effect, even if the pumping continues during an entire maximum refill time Tm. In other embodiments that monitor the pressure and/or the flow rate of the fuel in the fuel plumbing system, if the internal torch reservoirs are already full, the pump is stopped almost immediately after being started. In essence, the pressure and/or flow sensors in these embodiments enable the controller to indirectly determine whether or not at least one of the torches is burning.

In still other embodiments, the controller is able to directly determine when the torches are burning and when they are not. In some of these embodiments, a schedule of operation is provided to the controller, as in the example presented above. In other embodiments, the torches are ignited and extinguished by the controller, for example by activating wick igniters to initiate burning and by reverse pumping to extinguish the torches, such that the controller is necessarily aware of when the torches are burning and when they are not. In other embodiments, a heat sensor in communication with the controller is provided proximate the wick of at least one of the torches, thereby enabling the controller to detect whether and when the torch is burning. In some of these embodiments where heat sensors are provided with a plurality of the torches, the outputs of the heat sensors are combined, so that only a single interconnection with the controller is required. For example, the outputs of the heat sensors can be combined into a logical "OR" output, such that the combined output toggles between an idle state in which none of the torches is burning and no refilling is required, and an active state in which at least one of the torches is burning and requires periodic refilling.

The provision of heat sensors in embodiments can also improve the safety of the system, in that, if a leak in the plumbing system allows the fuel to drain out of the local torch reservoirs, thereby unexpectedly extinguishing the torches, the controller will cease to initiate any additional refueling and, in embodiments, will issue an alarm to a user indicating that a failure and potential fuel leak has occurred.

Providing at least one heat sensor proximate the wick of a torch also enables the controller, in embodiments, to determine the "wick burning time," Tw, during which the torches will continue burn after their local reservoirs are emptied by reverse flow, so that the torches can be extinguished at a desired time Te by emptying their local fuel reservoirs at a time Te–Tw.

Embodiments of the present invention include estimating a total fuel consumption of the system, and predicting when the central fuel reservoir will require refilling. These estimates can be based on total burning time of the torches, for example as reported by heat sensors or determined based on a history of igniting and extinguishing the torches by the controller, or on a burning schedule provided by a user. Total fuel consumption can also be estimated based on flow rates measured by a flow sensor and the durations thereof. Some embodiments that include heat sensors are able to estimate fuel consumption based on burning rates of the torches, as estimated according to temperatures recorded by the sensors, in that a higher measured temperature will indicate a more rapid consumption of fuel by the torch.

In some of these embodiments, a remote service provider automatically orders and delivers replacement fuel as needed to the operator of the torch system according to the estimated fuel consumption. This approach has the added benefit of ensuring that the liquid fuel consumed by the torches is consistent in its quality and properties, thereby reducing system maintenance and improving the accuracy of the fuel consumption estimates, as well as extending the useful life of the system and enabling the manufacturer or other service provider to offer improved and/or extended warranty protection. In some of these embodiments, the service provider is also able to schedule preventive maintenance, such as wick replacements, based on the estimated or measured burning times of the torches.

In some embodiments where the torches include remotely actuated wick igniters, the wick igniters are individually operable by the controller, so that the controller is able to stagger the ignition of the torches. For example, in some embodiments, if the controller is commanded to ignite all of the torches, it applies an ignition voltage to the wick igniters sequentially rather than simultaneously. This approach of staggering the wick ignitions ensures that the power applied by the controller to the wick igniters never exceeds the power required to ignite a single torch, thereby greatly reducing the power and current capacity that is required by the torch ignition system.

It should be noted that while the torches are interconnected with each other and with the central reservoir by the fuel plumbing system, the torches in the disclosed system are otherwise structurally independent and separate from each other and from the central reservoir, although embodiments further include wires that convey signals and/or electrical power between devices such as heat sensors and/or wick igniters deployed with the torches and the central controller.

One general aspect of the present invention is an automatically refueled liquid fuel burning torch system comprising a central fuel reservoir configured to contain a combustible liquid fuel, at least one torch. Each of said torches has a substantially enclosed interior and a local fuel reservoir located within said enclosed interior, the local fuel reservoir being configured to contain a local quantity of said fuel. Each of said torches further includes a combustion area exterior to the torch and configured for burning said fuel when drawn by a wick from said local quantity into said combustion area. And each of said torches has a fuel overfill prevention valve (FOP valve) installed therein, said FOP valve being configured to be mechanically controlled by a local fuel level of the local quantity of fuel within the enclosed interior, and to be automatically closed when the local fuel level reaches a determined maximum height within the enclosed interior, thereby preventing further ingress of fuel into the local fuel reservoir.

The torch system further includes a fuel plumbing system configured to convey said fuel from the central fuel reservoir to the local reservoirs of each of said torches, a refueling system comprising a pump, an electronically actuated shutoff valve, and a controller, the controller being able to actuate the pump and the shutoff valve.

The controller is configured to execute the following steps:

A) initiate a refueling period by activating said pump and opening said shutoff valve, thereby establishing a fuel pressure within the fuel plumbing system that is above ambient pressure, and thereby causing fuel to flow from the fuel plumbing system into each of said torches until the local fuel level within each of said torches reaches the determined maximum height and the FOP valve within each of the torches is closed;

B) terminate the refueling cycle by stopping the pump and closing the shutoff valve, the shutoff valve thereby preventing fuel from flowing out from the fuel plumbing system;

C) wait for a pre-calibrated time Tr during which the local fuel levels in the torches are predicted to fall from the determined maximum height to a determined minimum height due to burning of the fuel by the torches; and D) repeat steps A) through C).

The torches do not include fuel level sensors or remotely controlled electronic valves. The torches, while interconnected with each other and with the central reservoir by the fuel plumbing system, are otherwise structurally independent and separate from each other and from the central reservoir.

In embodiments, the at least one torch comprises a plurality of the torches.

In any of the above embodiments, in step B) the controller can be configured to terminate the refueling period at a pre-calibrated time Tf that is required for local fuel levels in all of the torches to rise from the minimum height to the maximum height.

In any of the above embodiments, the system can further comprises at least one of a pressure sensor in communication with the controller and configured to measure a pressure of the fuel within the fuel plumbing system, and a flow rate sensor in communication with the controller and configured to measure a rate of flow of fuel from the central reservoir to the torches, and in step B), the controller can be configured to terminate the refueling period when a pressure increase is detected in the fuel plumbing system indicating a backpressure due to closing of all of the FOP valves, and/or a cessation is detected of the flow of the fuel from the central reservoir to the torches. In some of these embodiments the controller is configured to terminate the refueling period and to suspend any subsequent refueling periods if no backpressure or cessation of the flow of the fuel is detected and the refueling cycle has continued beyond a predicted refueling time Tf by more than a maximum "delta" time interval. And in some of these embodiments the controller is further configured to issue an alarm indicating that a fuel leakage may have occurred if no backpressure or cessation of the flow of the fuel is detected and the refueling period has continued beyond the predicted refueling cycle time Tf by more than the maximum "delta" time interval. In any of these embodiments, if a backpressure or cessation of the flow of the fuel is detected at a time Tf' that is either less than Tf or exceeds Tf by an amount that is less than the maximum "delta" time interval, the controller can be configured to adjust Tf to be equal to Tf'.

In any of the above embodiments, the controller can be configured to continuously repeat steps A) through C) regardless of whether any of the torches are burning or not, or the controller can be configured to perform steps A) through C) only when the torches are burning.

In some embodiments where the controller is configured to perform steps A) through C) only when the torches are burning, a burning schedule is provided to the controller, and/or the torches are ignited and extinguished by the controller. In some of these embodiments each of the torches includes an electronic ignitor that can be activated by the controller.

In some embodiments where the controller is configured to perform steps A) through C) only when the torches are burning, and the torches are ignited and extinguished by the controller each of the torches includes an electronic ignitor that can be activated by the controller. the at least one torch includes a plurality of torches, and the controller is configured to ignite the torches sequentially, so that an igniting voltage is never applied to two of the torches at the same time.

In any of the above embodiments, the controller is able to extinguish the torches by reversing a direction of flow of the pumping system, thereby draining the fuel out of the local fuel reservoirs of the torches, the torches being thereby extinguished after a time Tw during which residual fuel contained in the wicks of the torches is exhausted.

Any of the above embodiments can further include a heat sensor located proximate the wick of a first of the torches and in communication with the controller, said heat sensor being configured to transmit a signal to the controller indicating that one of the torches is burning fuel. In some of these embodiments the at least one torch includes a plurality of the torches having heat sensors located proximate their wicks, and wherein outputs of the torches are combined into a single combined output in communication with the controller, said combined output being configured to toggle between an idle state in which none of the torches is burning and an active state in which at least one of the torches is burning. In any of these embodiments the controller can be able to extinguish the first torch by reversing a direction of flow of the pumping system, thereby draining the fuel out of the local fuel reservoir of the first torch, the first torch being thereby extinguished after a time Tw during which residual fuel contained in the wick of the first torch is exhausted, the controller can be able to determine Tw by monitoring the heat sensor, and the controller can be subsequently able to extinguish the first torch at a desired time Te by draining the fuel out of the local fuel reservoir of the first torch at a time Te−Tw.

A second general aspect of the present invention is a method of maintaining an automatically refueled liquid fuel burning torch system. The method includes providing an automatically refueled liquid fuel burning torch system according to any embodiment of the first general aspect, estimating a total burning time of the torches of the torch system, according to the estimated burning time, predicting a refueling date when the central reservoir of the torch system will require refilling with liquid fuel, and delivering liquid fuel to an operator of the torch system in advance of the refueling date.

In some embodiments where the torch system includes a heat sensor located proximate the wick of a first of the torches and in communication with the controller, said heat sensor being configured to transmit a signal to the controller indicating that one of the torches is burning fuel, estimating a total burning time of the torches comprises determining a burning time of the torches according to the signals transmitted by the heat sensor. And in some of these embodiments predicting the refueling date includes determining a usage pattern of the torches according to the signals transmitted by the heat sensor.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is a liquid fuel burning torch system that can maintain the burning of a plurality of torches for extended periods of time without user maintenance, without requiring that the torches include fuel level sensors and/or remotely controlled electronic valves, and without requiring that fuel be perpetually maintained at a pressure above ambient within the fuel plumbing system. Embodiments further eliminate any need for the torch operator to track fuel reserves, and to pre-order and provide fuel in advance of periodic refilling of the central reservoir.

Figure 1:
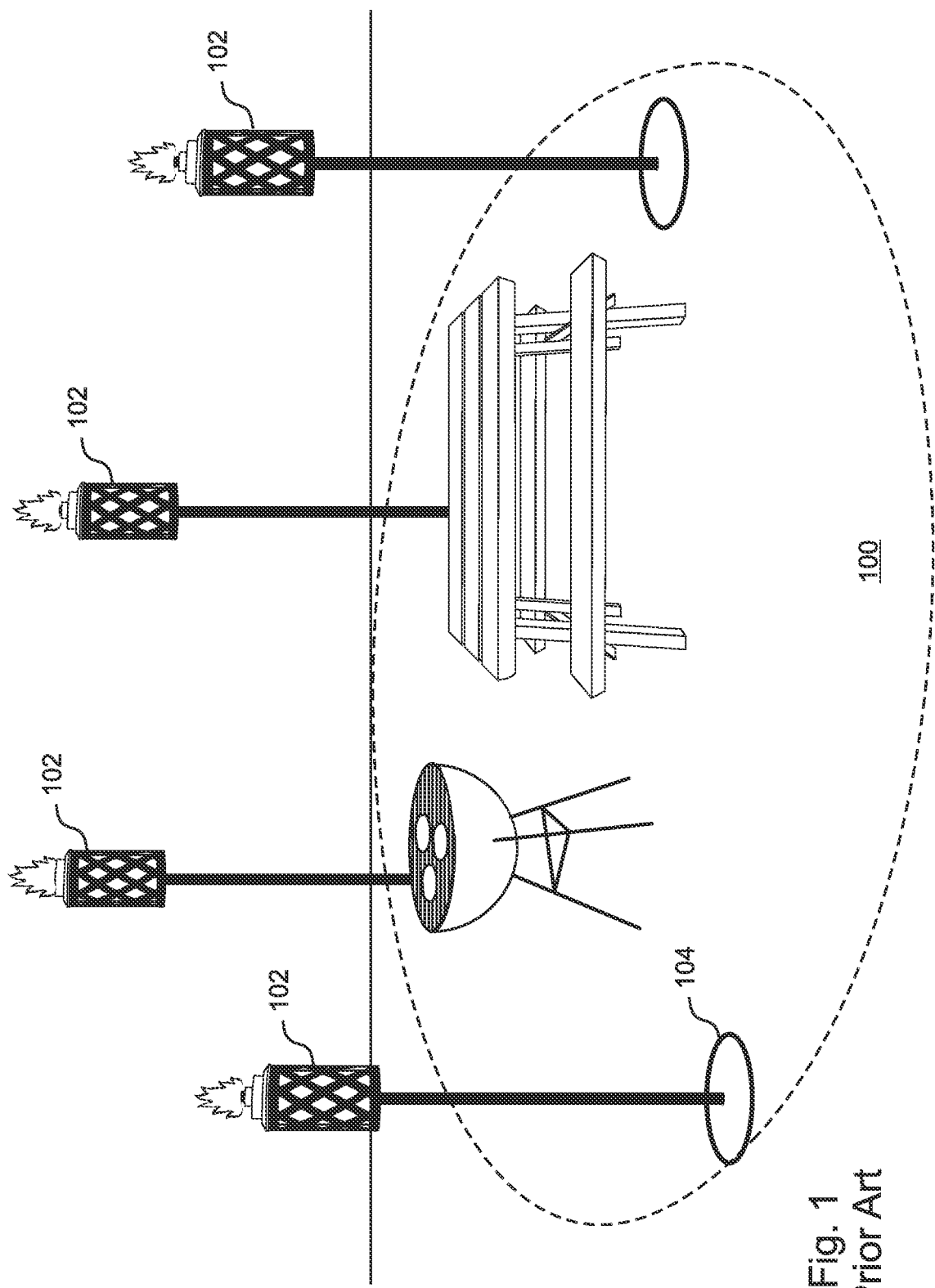
FIG. 1 illustrates prior art liquid fuel torches that are manually refilled.
Figure 2A:
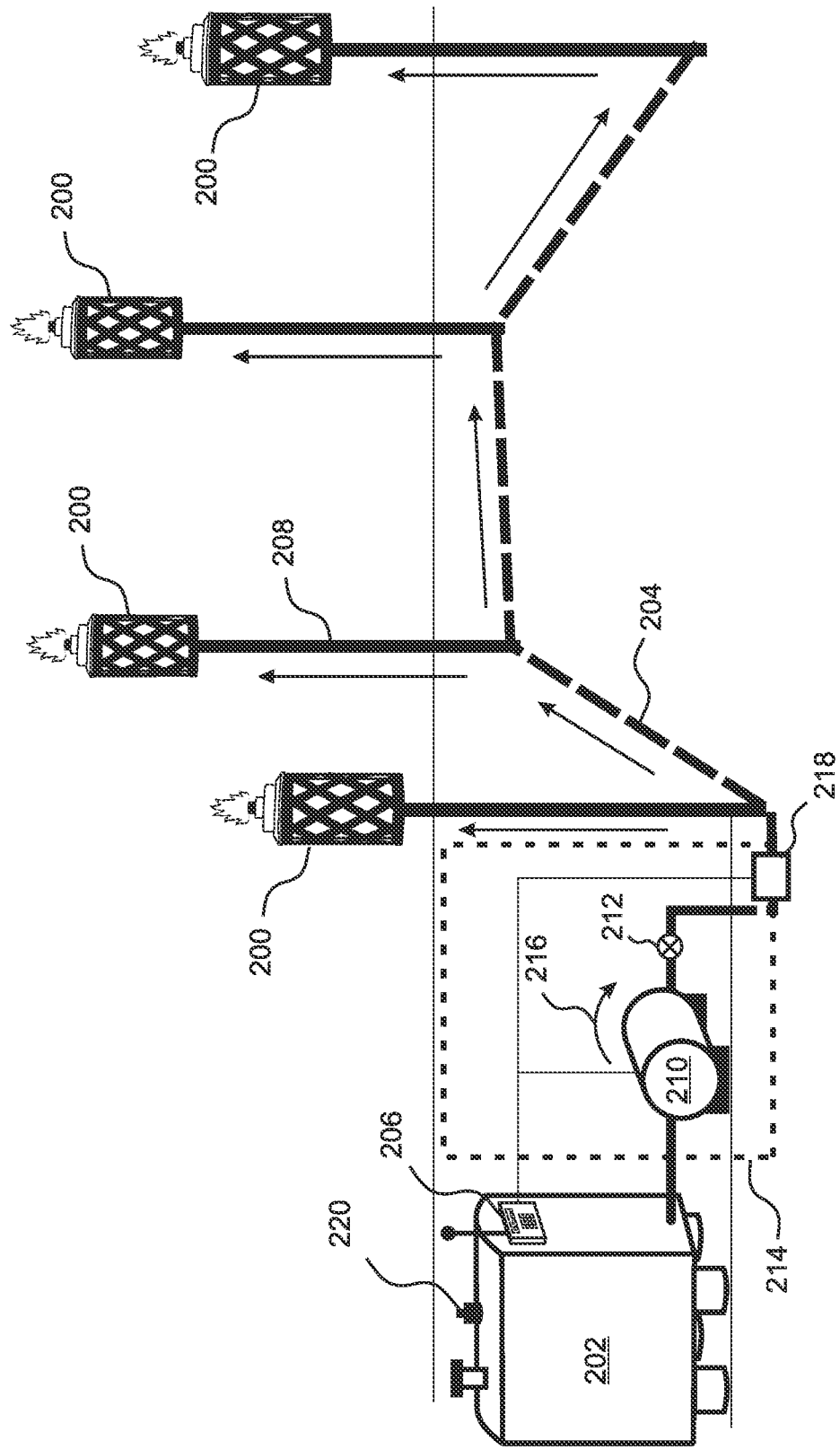
FIG. 2A is a perspective view of a torch system in an embodiment of the present invention wherein the fuel pumping system includes a single pump having a pumping direction that is reversable, shown with the pump operating in a forward direction and the torches supplied with fuel and lit.
Figure 2B:
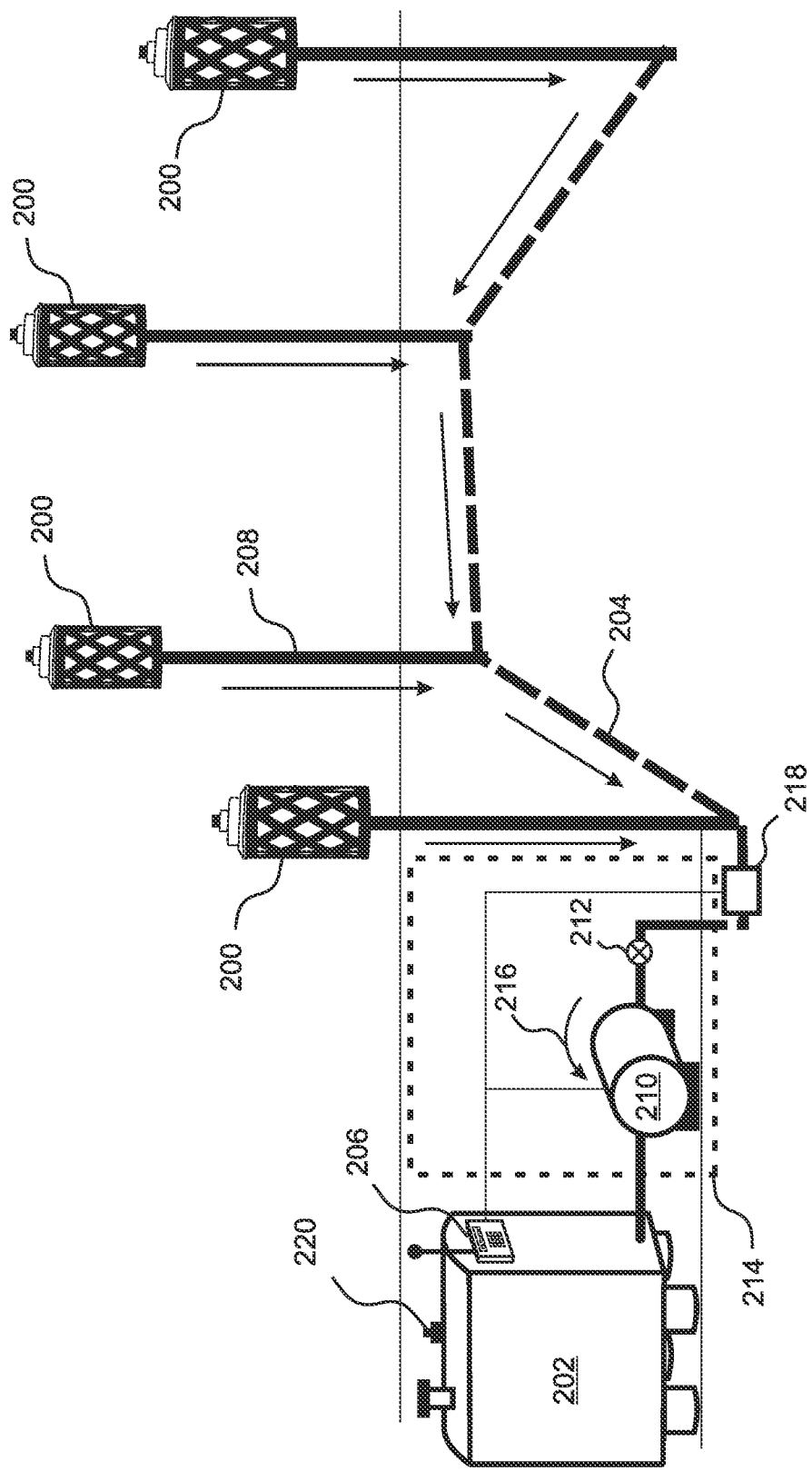
FIG. 2B is a perspective view of the torch system of FIG. 2A shown with the pump operating in a reverse direction and the torches extinguished due to lack of fuel.

With reference to FIGS. 2A and 2B, the present invention is an automatic torch refueling system that can refuel an arbitrary number of interconnected, liquid fuel burning torches 200, as needed, by causing a fuel pumping system 214 to pump liquid fuel from a central reservoir 202 through the pipes or hoses 204 and through hollow standpipes 208 that support the torches. As a result, with reference to FIG. 2A, the torches 200 can continue to burn almost indefinitely. It will be noted that the vertical standpipes 208 in combination with the pipes and hoses that interconnect them with the central reservoir 202 are, in aggregate, referred to herein as the fuel plumbing system 204, 208. In the embodiment of FIGS. 2A and 2B, the fuel pumping system 214 includes only a single pump 210. A check valve 212 ensures that fuel does not gravitationally drain out of the torches 200 when the pump 210 is not operating.

The refueling system further includes a controller 206 that controls the fuel pumping system 214 and other controllable elements of the system. In the illustrated embodiment, the controller 206 receives input from a pressure sensor and/or a flow rate sensor 218 in fluid communication with the fuel plumbing system 204. Note that in FIGS. 2A and 2B, element 218 can represent either a pressure sensor or a flow rate sensor. The illustrated embodiment further includes a reservoir level sensor 220 that monitors the amount of fuel that is remaining in the central reservoir at any given time. Measurements made by the reservoir level sensor 220 are reported to the controller 206, and can be used to determine when additional fuel should be added to the central reservoir 202. The reservoir sensor 220 can be of any kind known in the art, including a float sensor or, as illustrated, an ultrasonic sensor 220 that uses time-of-flight ultrasonic echo measurements to determine a level of fuel in the central reservoir 202.

When the torches 200 are in use, as shown in FIG. 2A, the controller 206 automatically causes them to be refilled as needed. In the embodiment of FIGS. 2A and 2B, the controller 206 can be accessed remotely via wireless communication, so that the status of the torch refueling system can be monitored and/or controlled remotely, for example via a "smart" cellular telephone or similar portable, handheld device.

With reference to FIG. 2B, when the torches 200 are no longer in use, embodiments of the present invention are further able to reliably extinguish the torches 200 under automated and/or remote control by reversing the direction of flow in the fuel plumbing system 204, thereby pumping most or all of the fuel from the torches 200 and returning the fuel to the central reservoir 202, so that the torches 200 are extinguished as soon as any residual fuel in their wicks 112 has been exhausted. This approach enables the torches 200 to be extinguished, while requiring that few if any special extinguishing elements or features are included in the torches 200.

Figure 3A:
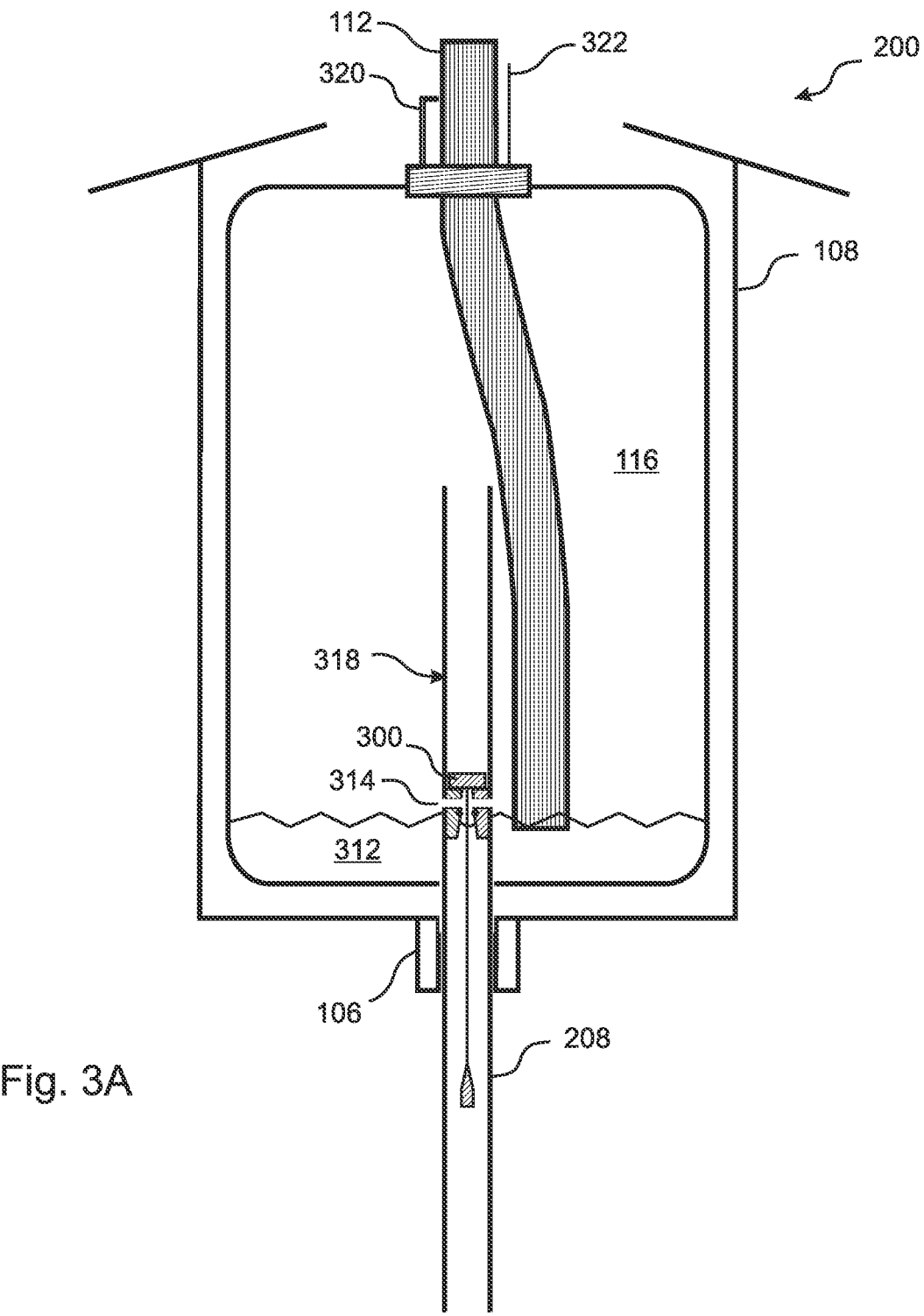
FIG. 3A is a cross sectional illustration of a fuel-burning torch having a fill pipe and fuel overfill prevention (FOP) valve installed therein, shown during initial filling thereof of fuel, according to an embodiment of the present invention.
Figure 3B:
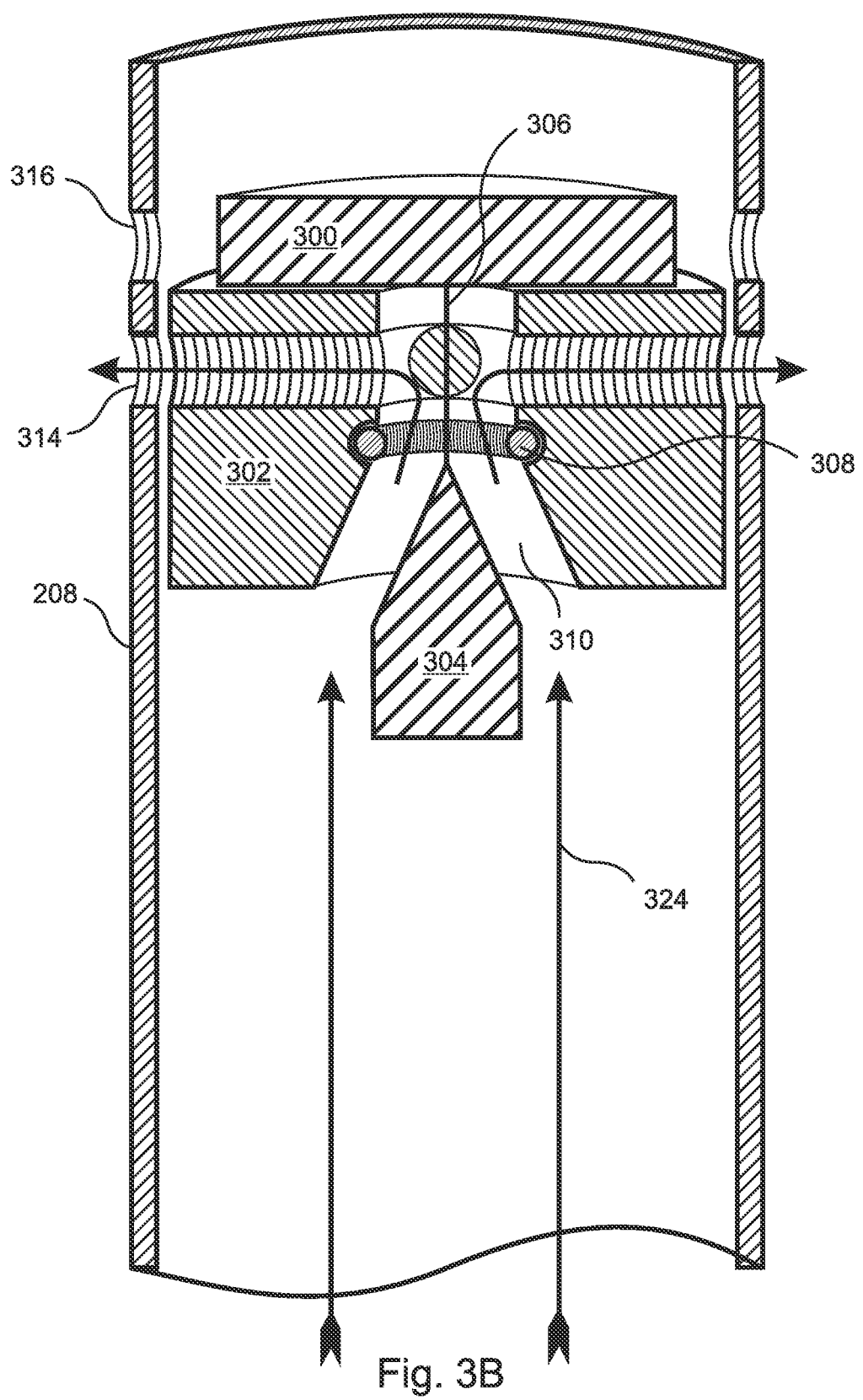
FIG. 3B is a sectional view of the standpipe and FOP valve in an embodiment similar to FIG. 3A but having a shorter interlinking wire or rod, shown in an open state.

With reference to FIGS. 3A and 3B, each of the torches 200 includes a wick 112 that extends from a local fuel reservoir (the "local reservoir") 116 to a combustion area. When in use, as the fuel 312 is burned and consumed in the combustion area, the wick 112 draws additional fuel 312 as needed from the local fuel reservoir 116. Each of the torches further includes a passive mechanical valve 318 which is sometimes referred to herein as a "fuel overflow prevention" valve or "FOP" valve 318, which in embodiments extends from or is inserted partially or fully within an upper portion of the standpipe 208. In the illustrated embodiment, the FOP valve 318 includes a float 300 that is lifted by the liquid fuel 312 as the fuel reservoir 116 is filled, and a seat 302 that is sealed by a plug 304 when the float 300 has risen by a certain amount. A flow 324 of the liquid fuel 312 enters the torch fuel tank through the fill hole 314, and some of the fuel flows back through the upper hole 316 so that the valve is filled with fuel above the seat 302, and the float 300 is lifted by the fuel 312.

Figure 3C:
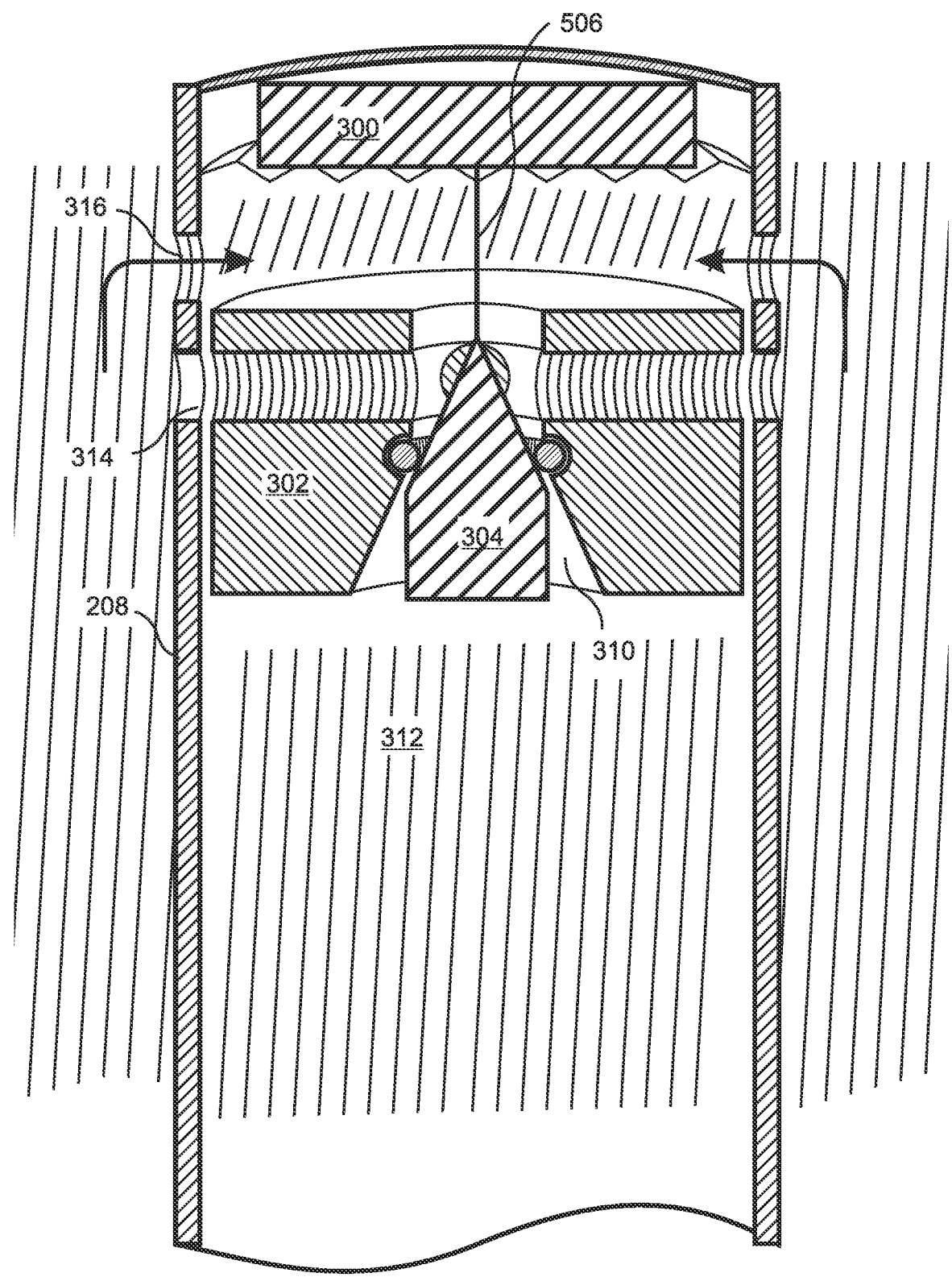
FIG. 3C is a sectional view of the standpipe and FOP valve of FIG. 3B, shown in a closed state.

In the illustrated embodiment, the float 300 and plug 304 are separate components that are interlinked by a wire or rod 306, so that the plug 302 is caused to rise when the float 300 is lifted up by the liquid fuel 312. The illustrated embodiment further comprises an O-ring 308 located within a tapered internal passage 310 of the seat 302, such that the liquid fuel 312 flows into the fuel reservoir 116, as shown in FIG. 3B, until the plug 304 is lifted sufficiently to be pressed into the O-ring 308, at which point the flow of liquid fuel 312 into the fuel reservoir 116 is blocked, as is illustrated in FIG. 3C.

Figure 3D:
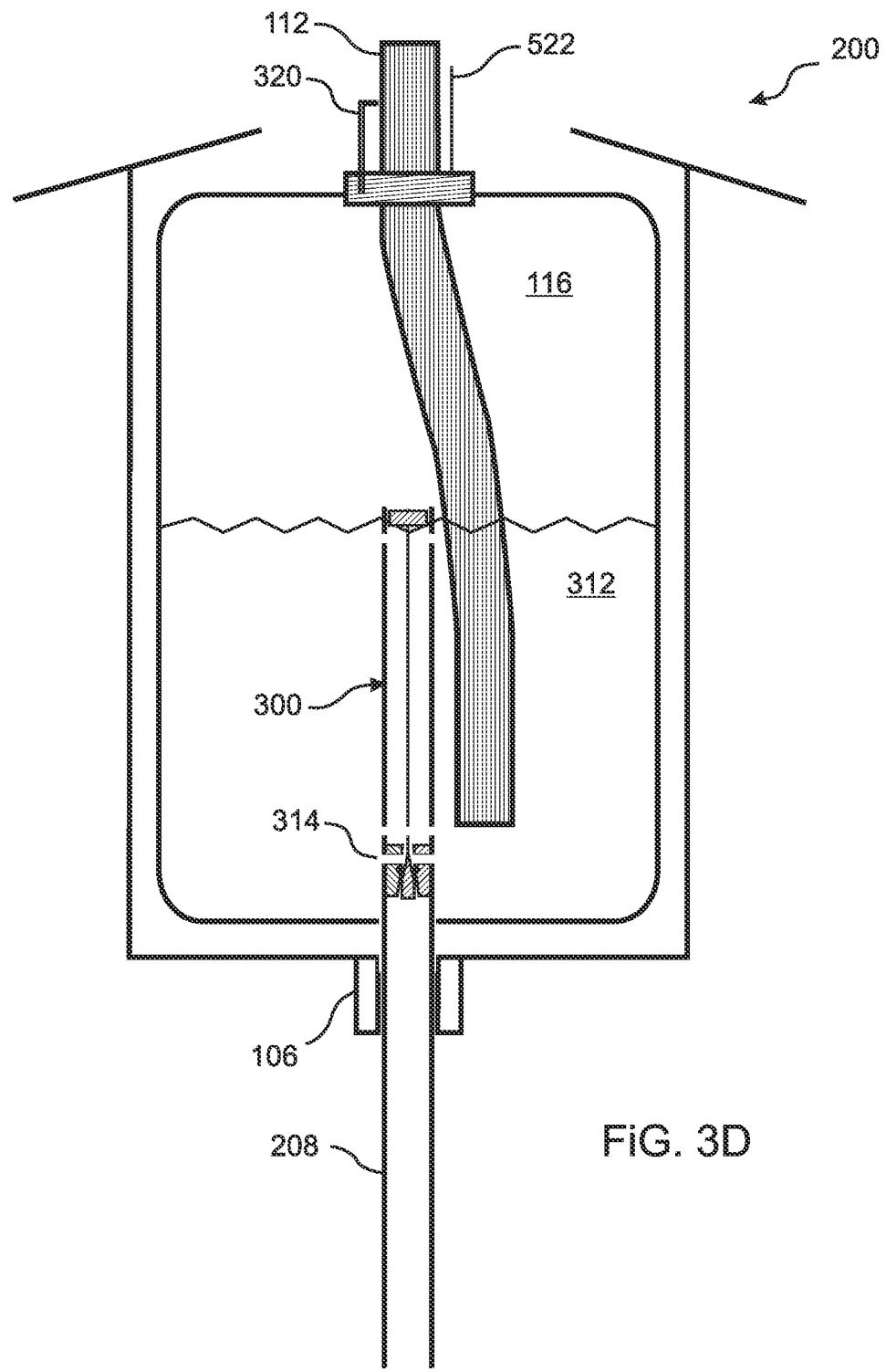
FIG. 3D is a cross sectional illustration of the embodiment of FIG. 3A, but showing the fuel reservoir filled with fuel up to the maximum level that is permitted by the FOP valve.

As is illustrated in FIG. 3D, the torches 200 can only be filled until the level of the liquid fuel 312 in the local fuel reservoir 116 reaches a fill limit, at which point the FOP valve 318 is closed and prevents further filling. Furthermore, when the valve 318 is opened, the fuel can only be drained to the level of the lowest fill hole 314. In the illustrated embodiment, the wick is configured such that it does not extend below the lowest fill hole 314. In some embodiments the seat 302 and plug 304 are located in the standpipe 208 below the bottom of the local fuel reservoir 116, which allows the lowest fill hole 314 to be positioned at or below the bottom of the internal fuel reservoir 116.

As is shown in FIGS. 3A and 3D, the illustrated embodiment further includes an automatic wick ignitor 320 that can be remotely actuated by the controller 206, either automatically and/or under remote control, to ignite the torches 200.

In addition, as shown in FIGS. 3A and 3D, the illustrated embodiment further includes a wick heat sensor 322 proximate the wick 112 in the combustion area and in communication with the controller 206 via wired or wireless communication, which enables the controller 206 to sense when the extinguishing process has been completed. Once the torch 200 has been extinguished, embodiments proceed to partly or fully refill the internal fuel reservoir 116 with fuel, so as to prevent the wick 112 from becoming dry and brittle. In these embodiments, the time required to refill the torches should not exceed Tm, as described above. In other embodiments, the internal fuel reservoir 116 of the torch 200 remains empty until shortly before it is reignited, so as to further reduce any possibility of fuel being spilled out of the torch 200 when it is not in use. In these embodiments, the time required to refill the torches should not exceed Te, as described above.

Figure 4A:
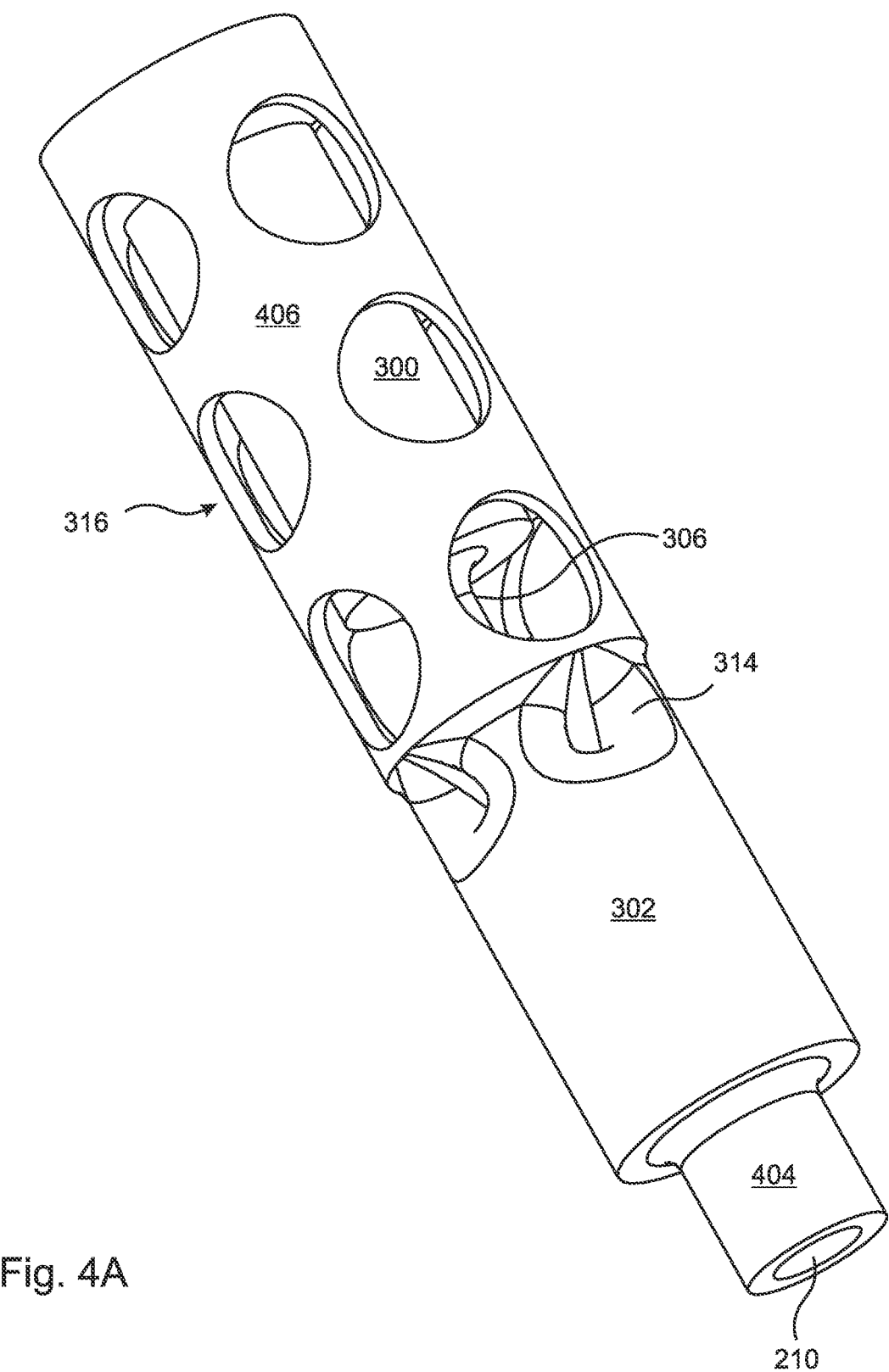
FIG. 4A is a perspective side view drawn to scale of an FOP valve in another embodiment of the present invention.

FIG. 4A is a perspective view of an embodiment that functions in a manner similar to FIGS. 3A-3D, but wherein the liquid fuel is routed through the valve seat 302 such that it does not directly impact the plug 304 as the liquid fuel 312 flows from the standpipe 208 into the holding tank 116. Instead, with reference to the cross-sectional drawing of FIG. 4B, the plug 304 is suspended within a plug chamber 400 that is in liquid communication with the flow of liquid into the fuel tank 116, but is located below the flow path of the liquid fuel 312, so that the plug 304 is offset from the flow path. This approach avoids any concern that rapidly flowing liquid during filling of the fuel tank 116 could push the plug 304 upward into the seat 302 before it is lifted by the float 300, thereby prematurely closing the valve 318, and possible leading to repetitive closing and opening of the valve 318 as it is filled.

Figure 4B:
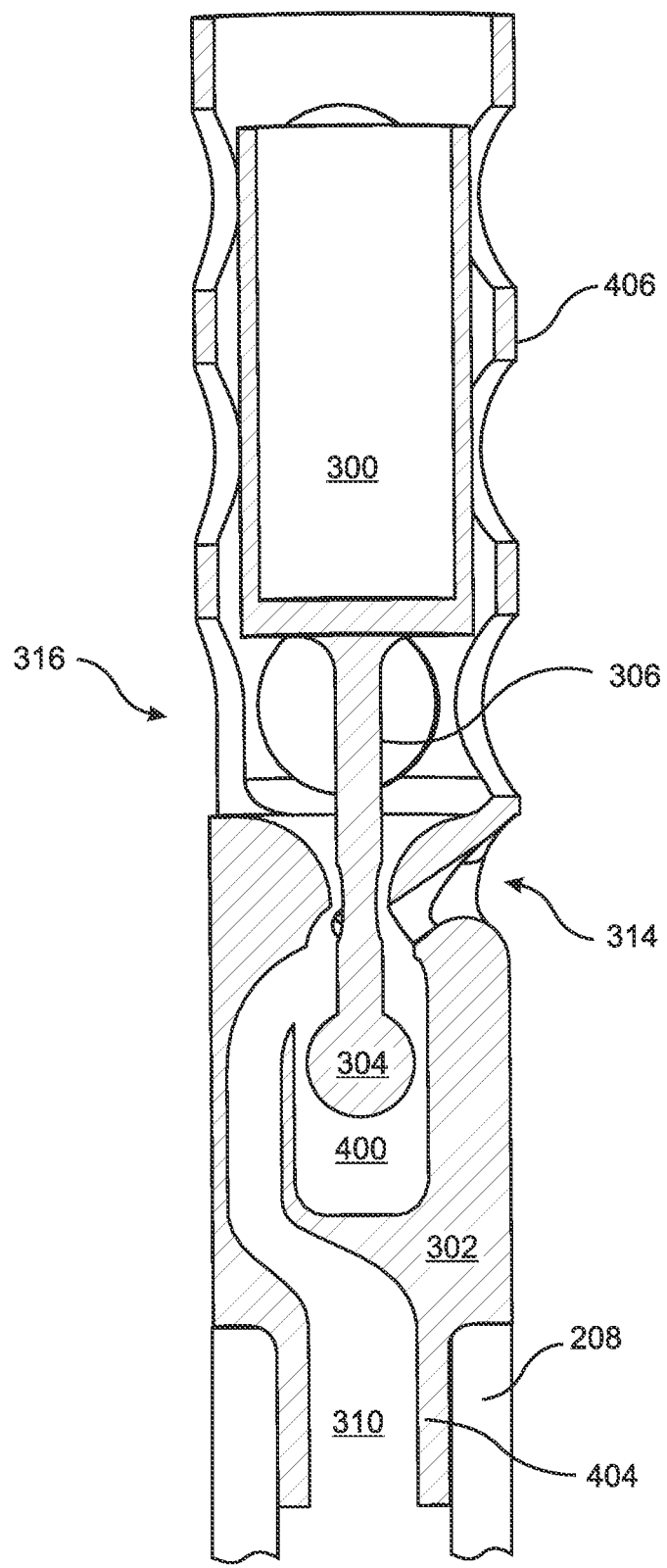
FIG. 4B is a cross-sectional side view drawn to scale of the embodiment of FIG. 4A, shown with the FOP valve in an open state.
Figure 4C:
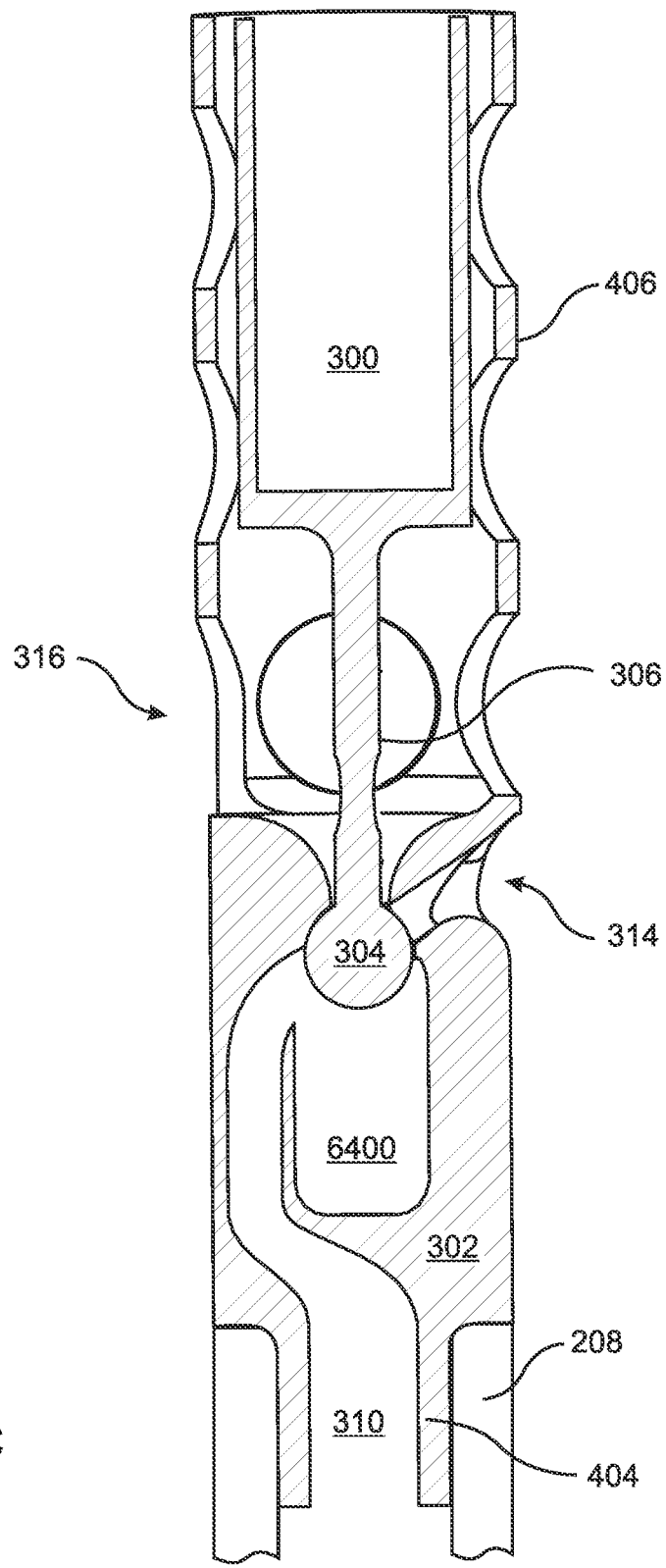
FIG. 4C is a cross-sectional side view drawn to scale of the embodiment of FIG. 4B, shown in a closed state.

FIG. 4B shows the valve 318 in its open configuration, while FIG. 4C is a cross-sectional drawing illustrating the embodiment of FIG. 4B when the valve 318 is closed.

If the FOP valve in a torch 200 is closed, as illustrated in FIG. 4C, the local fuel reservoir 116 of the torch 200 will initially retain its fuel content even if the pumping direction has been reversed. However, as soon as the fuel level within the local reservoir 116 drops even slightly below the fill limit, due to the continued burning of the torch and consequent consumption of the fuel, the FOP valve will open, and will allow the remaining fuel to be pumped out of the local fuel reservoir 116. Nevertheless, with reference to FIG. 4D, embodiments of the present invention further include a check valve 402 that allows the liquid fuel 312 to be pumped out of the fuel tank 116 even if the FOP valve 318 is closed. The check valve 402 is normally closed so long as there is liquid pressure within the standpipe 208. However, the check valve 402 is configured to automatically open when the liquid pressure within the standpipe 208 drops below a specified threshold pressure, thereby allowing any liquid that is within the fuel tank 116 to drain out of the holding tank 116, even if the valve 318 is closed, if the liquid fuel 312 is withdrawn from the standpipe 208.

Figure 4D:
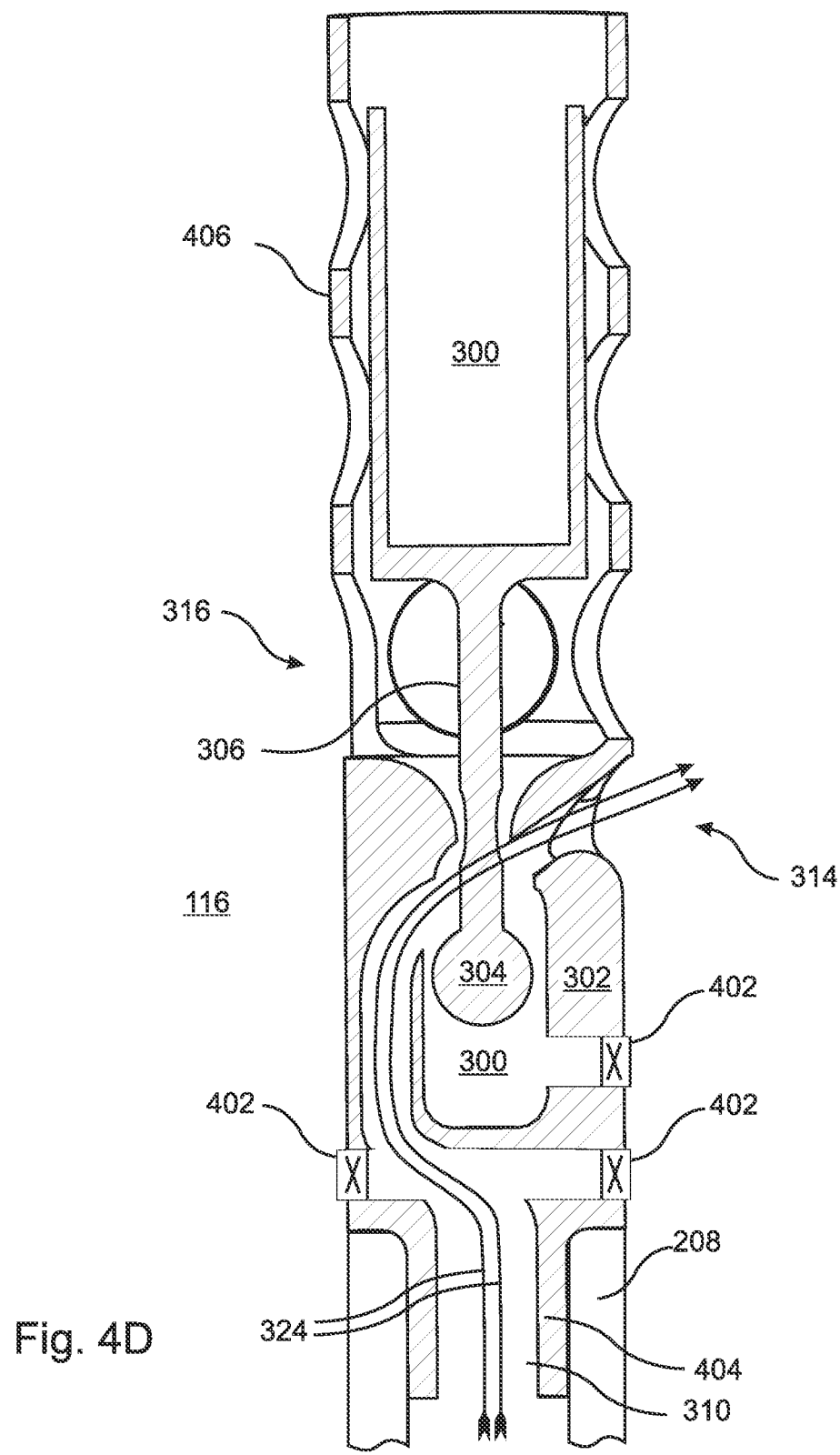
FIG. 4D is a cross-sectional side view drawn to scale of an embodiment similar to the embodiment of FIGS. 4A-4C, but further including check valves that are configured to enable draining of the holding tank when pressure is withdrawn from the standpipe, even if the FOP valve is closed.
Figure 4E:
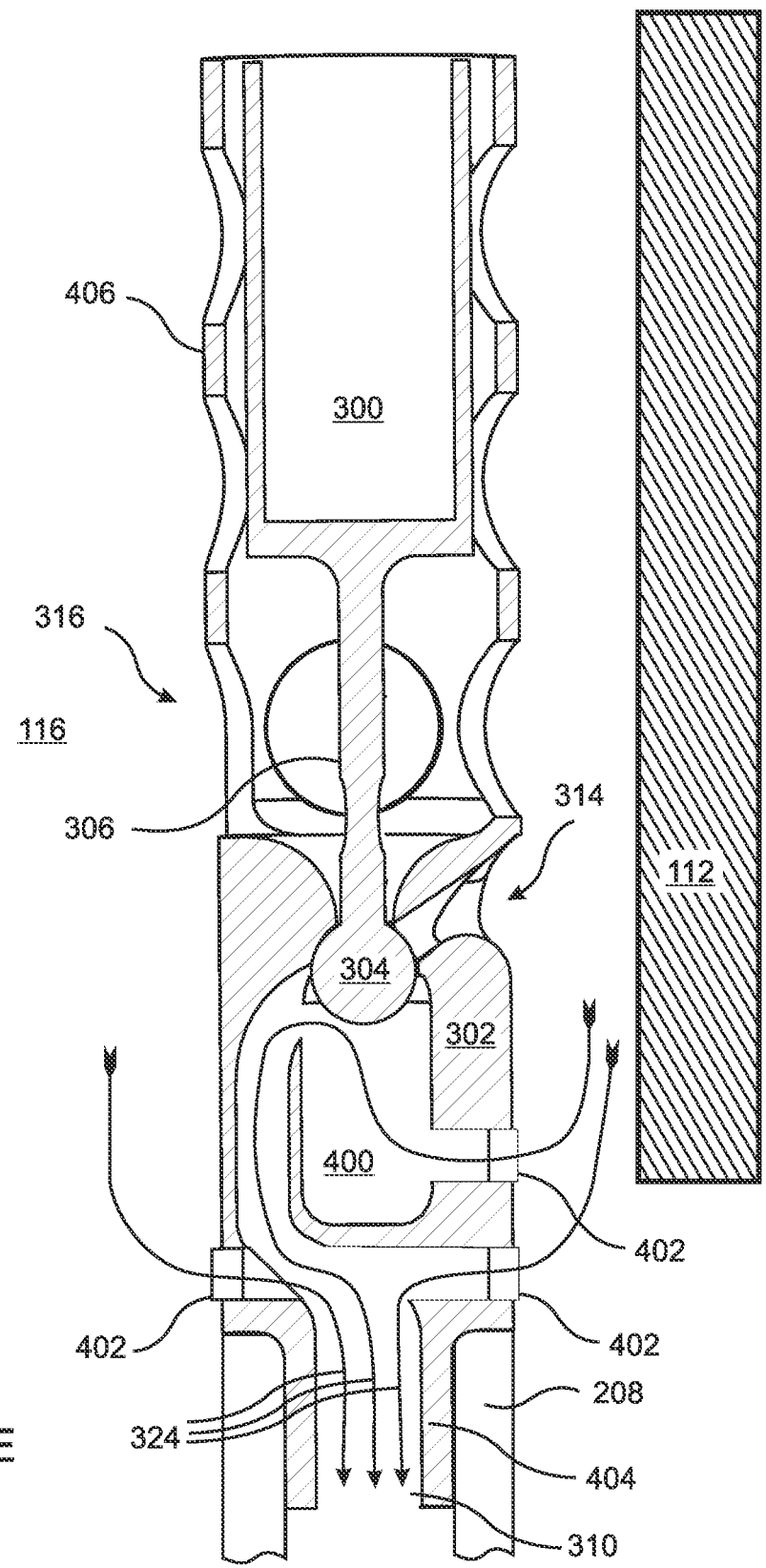
FIG. 4E is a cross-sectional side view drawn to scale of the embodiment of FIG. 4D, showing the fuel draining flow and wick height within the torch.

FIG. 4E is a cross-sectional view of the valve 318 of FIG. 4D illustrating the flow of the liquid fuel 312 out of the fuel tank 116 when the valve 318 is closed and the check valves 402 are open. FIG. 4E further illustrates that this configuration is able to lower the level of the liquid fuel 312 below the bottom of the wick 112. It can also be seen in FIGS. 4D and 4E that a pair of check valves 402 are provided on opposite sides near the bottom of the seat 302. This approach ensures that even if the wick 112 extends nearly to the bottom of the local fuel reservoir 116, it cannot block all of the check valves 402, thereby ensuring that the nearly all of the fuel can be drained from the local fuel reservoir 116, and nearly always below the bottom of the wick 112.

It is notable that in the embodiment of FIGS. 3A-3D the FOP valve 318 is contained entirely within the standpipe 208, while the FOP valve 318 in the embodiment of FIGS. 4A-4E includes a lower stem 404 that is inserted into the standpipe 208, while an upper portion 406 extends beyond the standpipe 208 and has an outer diameter that is equal to the outer diameter of the standpipe 208.

According to the present invention, the torches 200 do not include remotely monitored fuel level sensors. Nor does the present invention require that fuel pressure be maintained in the fuel plumbing system 204, 208 at all times. Instead, the controller 206 is configured to implement a predictive method of determining when to activate the pump 210 and thereby refill the torches 200. In embodiments, this predictive method is directed to estimating the amount of burning time Tr that is required to consume a defined percentage of the fuel 312 contained within the local fuel reservoir 116 of a single torch 200. The time Tr is also referred to herein as the "refill" time for the system, in that it represents the time that will elapse after a refilling of the torches 200 before they will need to be refilled again. If the torches 200 are not all identical to each other in terms of how long they can burn between refills, then Tr can be defined as the minimum amount of burning time that will elapse before at least one of the torches 200 has consumed the defined percentage of its local fuel supply.

Because all of the torches 200 are filled simultaneously and completely when the pump 210 is operated, it is not necessary to separately characterize or monitor each of the torches 200. According to the disclosed method, whenever at least one of the torches 200 needs to be refilled, all of them are refilled. Because the torches operate independently between refills, Tr will be a property of each individual torch, depending on the capacity and shape of the local fuel reservoir and the configuration of the FOP valve 318, and can be determined when the system is first installed.

Once Tr has been determined, the pump 210 can be activated whenever the burning time for the torches 200 reaches Tr. As a simple example, with respect to FIG. 5, if the torches are operated according to a fixed schedule, for example the torches are ignited at 7:00 PM and extinguished at midnight, and if the initial calibration determines that 80% of the fuel in each torch will be consumed every hour while they are burning (Tr=1 hour), then the controller can be configured to turn on the pump 210 to refuel the torches 200 at 7:00 PM, and again at the top of each subsequent hour until midnight. In the illustrated example, the torches 200 are initially empty, and are all filled to 100% by the first "refueling period" 500 during which the pump 210 is operated until all of the torches 200 are full. At this point, a valve 212 in the fuel plumbing system 204, is closed by the controller 206 to prevent any fuel from flowing back from the torches 200 into the central reservoir 202, and the pump 210 is stopped. In the illustrated example, the torches 200 are provided with remotely controlled ignitors 320, which are instructed to light the torches 200 at the end of the first refueling period 500.

As the torches 200 continue to burn fuel, the fuel level 502 in each of the local reservoirs of the torches slowly decreases. However, at a "refilling" time Tr after the first refueling period 500, a second refueling period 500 is initiated by the controller. The refilling time Tr is chosen according to an initial calibration which indicates that each torch 200 will consume 80% of the fuel within its local reservoir 116 after burning for one hour. At midnight, a reverse-flow pumping cycle 504 is used to drain the remaining fuel out of the torches, thereby causing the torches to be extinguished as soon as the fuel that remains in their wicks 112 is exhausted. In some embodiments, an additional refueling period 500 is initiated after the torches 200 are extinguished, to ensure that the wicks 112 are not damaged by excessive drying, and are ready to be ignited again as needed.

Figure 5:
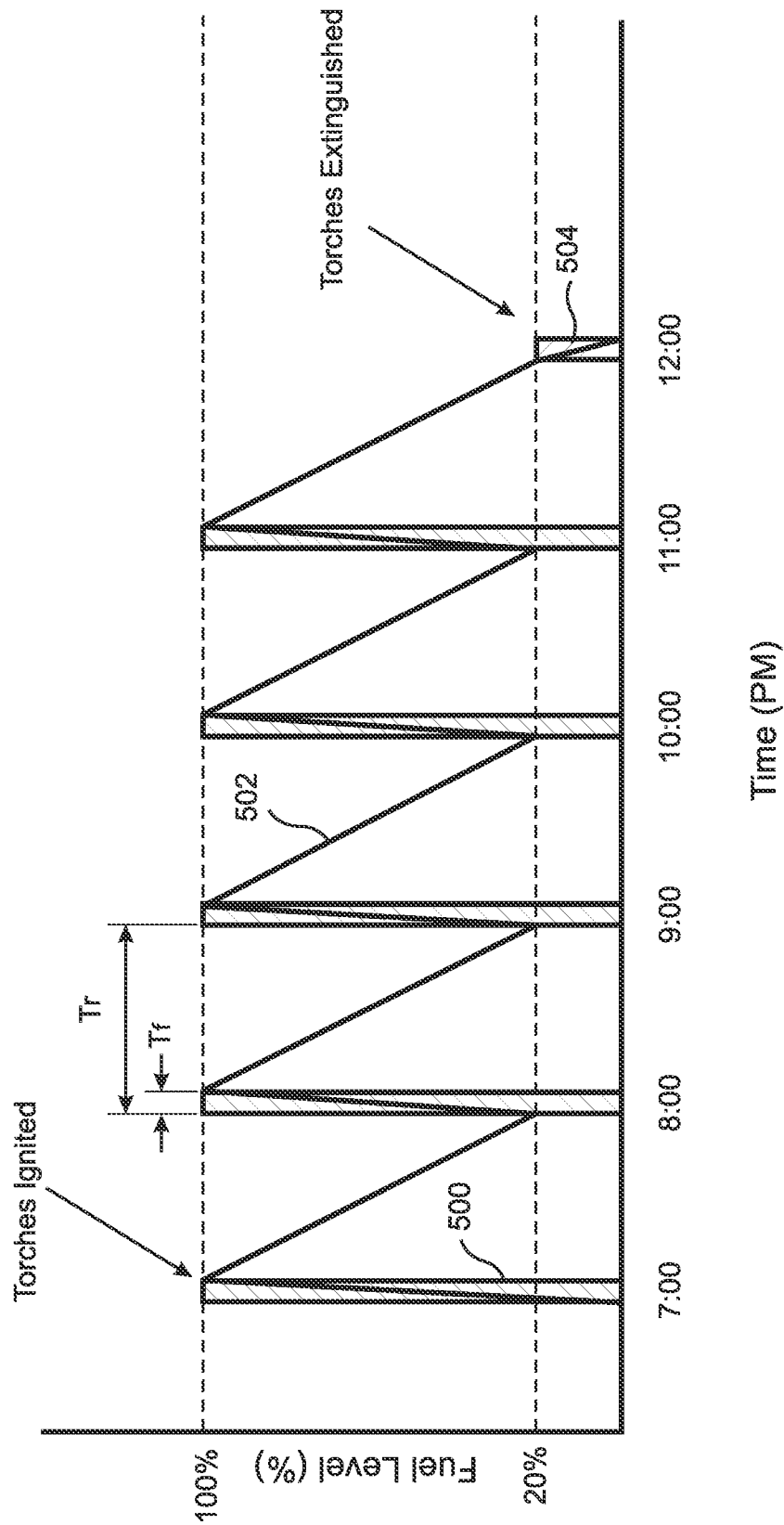
FIG. 5 is a graph of the fuel level within the local fuel reservoir of a torch in an embodiment of the present invention, shown during and in-between refueling periods while the torch is burning, and during reverse flow extinguishing of the torch.

The approach illustrated in FIG. 5 does not necessarily require that the torches 200 are operated according to a fixed schedule, so long as the controller 206 is made aware each time that usage of the system is initiated and terminated, so that the total burning time can be calculated. This will automatically be the case if, as in the example of FIG. 5, the torches 200 are ignited by instructing the controller 206 to activate electronic wick ignitors 320 that are provided with the torches 200, and extinguished by instructing the controller 206 to reverse the pumping direction of the system 504, so that the fuel is pumped out of the local reservoirs 106 of the torches 200.

Figure 6:
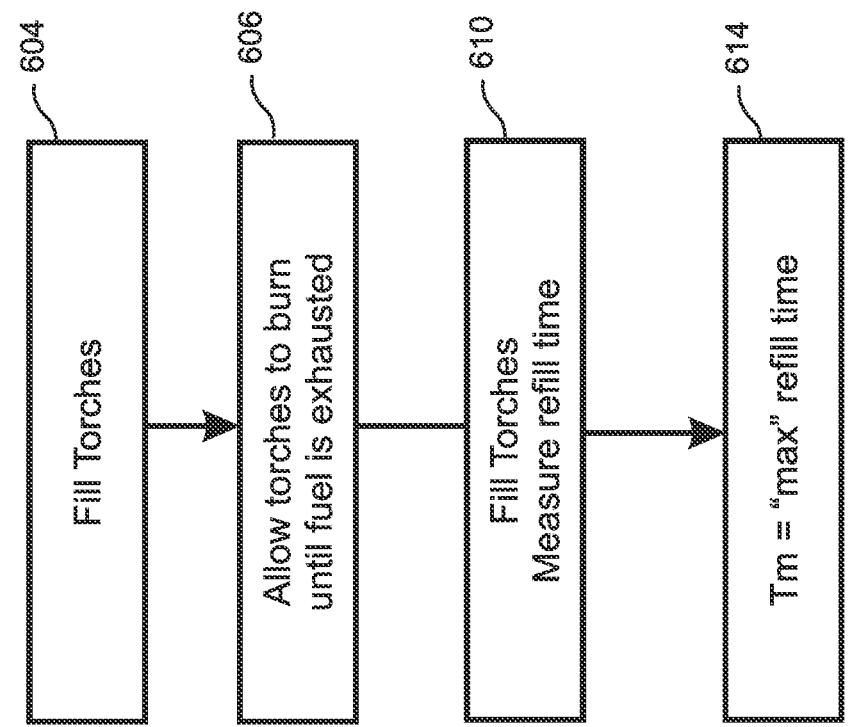
FIG. 6 is a flow diagram that illustrates methods of calibrating the maximum times required to fill the torches when the fuel plumbing system is empty Te and full Tm.
Figure 6:
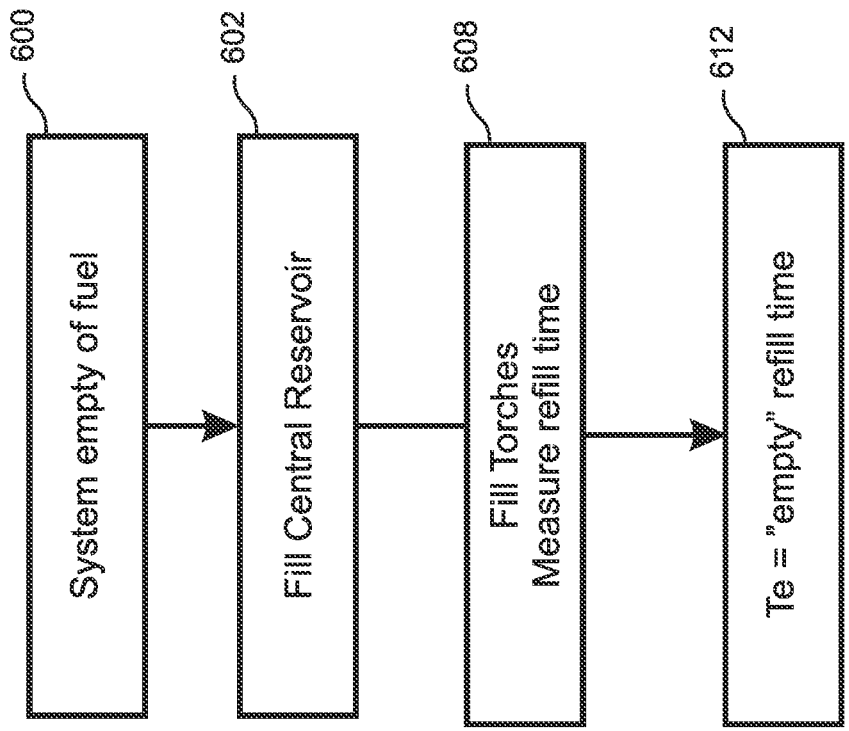

In some embodiments, the upper limits that apply to the time that is required to refill all of the torches is established by pre-calibration during initial installation of the system. With reference to FIG. 6, a calibration can be performed when the system is entirely empty of fuel 600, or when the fuel status is otherwise well characterized, and can include filling 602 the central fuel reservoir 210, activating the pump to fill 608 the torches 200, and then recording the time that elapses until all of the torches are filled. This time, referred to herein as Te, establishes a maximum time 612 required to refill the torches 200 and plumbing system 204, 208 when the plumbing system 204, 208 is empty of fuel.

An additional calibration can be performed and/or repeated at any time by filling 604 the torches 200 and then allowing them to burn without refilling until they are all extinguished due to lack of fuel 606. At this point, the time required to refill all of the torches 200 is measured 610. This measured time, which is referred to herein as Tm 614, established a maximum time required to refill the torches 200 when the plumbing system 204, 208 is already filled with fuel.

Due to the inclusion of the FOP valves 318 in the torches 200, it is not necessary to monitor the levels of fuel in the local reservoirs 116 of the torches 200. It is only necessary to operate the pump 210 for a time Te or Tm to ensure that all of the torches 200 will be filled and all of the FOP valves 318 will be closed. In some of these embodiments, a total refill cycle consists of alternately operating the pump 210 for a time Tm, and then allowing the torches 200 to burn for a time Tr, without any requirement to apply any sensors to the system. Once Te and/or Tm have been determined, in embodiments a refueling period consists merely of operating the pump for the time Te or Tm, depending on whether the plumbing system 204, 208 is full or empty, which will ensure that all of the torches 200 are filled and all of the FOP valves 318 are closed.

In still other embodiments, with reference again to FIGS. 2A and 2B, the fuel pressure within the fuel plumbing system is monitored by a pressure sensor 218 that is in communication with the controller 206, and/or the flow of fuel within the fuel plumbing system is monitored by a fuel flow sensor 218 that is in communication with the controller. Note that in FIGS. 2A and 2B, element 218 can represent either a pressure sensor or a flow rate sensor. Including at least one of these sensors 218 allows the controller 206 to detect when all of the torches 200 have been filled and all of the passive FOP valves 318 have closed, because the sensor(s) 218 will detect a backpressure in the fuel plumbing system 204, 208 and/or a cessation of fuel flow within the fuel plumbing system 204, 208. Accordingly, during each refueling period 500 the pump 210 in these embodiments will be allowed to operate until the measured backpressure and/or fuel flow indicates that all of the local FOP valves 318 have closed, and all of the torches 200 are full.

Figure 7:
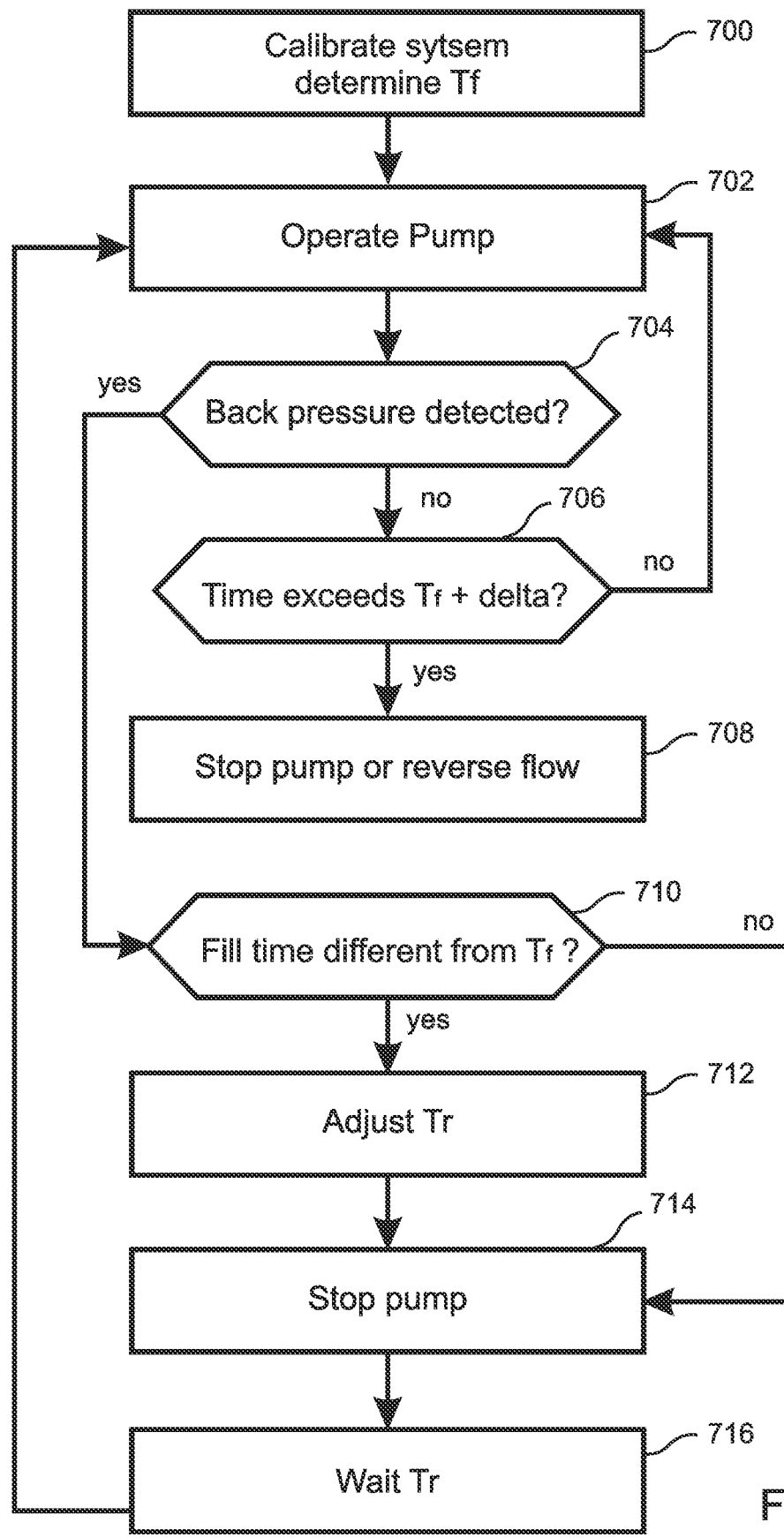
FIG. 7 is a flow diagram illustrating steps implemented by the controller during a refueling cycle in an embodiment of the present invention.

FIG. 7 is a flow diagram that illustrates an embodiment of the method of the present invention that includes a pressure sensor or flow sensor 218. The method begins by calibrating the system 700 to determine the fill time Tf of the torches 200. When it is determined that the torches 200 should be refilled, the pump is operated 702 until a backpressure is detected 704 in the plumbing system 204, 208. In some embodiments, if the previously calibrated time Tf required to completely fill the torches is exceeded by more than a specified "delta" amount 706, and yet no backpressure or cessation of fuel flow is detected 704, the controller 206 will conclude that one of the FOP valves 318 has failed, or some other leak or failure has occurred in a torch 200 or in the fuel plumbing system 204, 208, and will stop the pump 210 or reverse the pumping direction 216 to minimize any spillage of excess fuel 708. Otherwise, if there is a significant change to the filling time 710, but the change is less than "delta," then the controller 206 will conclude that the burning rate of the torches has changed, for example due to a change in the composition of the fuel, wind conditions, or adjustments made to the wicks 116, and will adjust Tr accordingly 712 to ensure that a desired margin of fuel is retained in the torches 200 at all times. Upon detecting the backpressure or a change in fuel flow rate 704, the controller 206 will also stop the pump 714, and will wait 716 for a time equal to Tr before resuming operation of the pump 702 to once again refill the torches 200.

In some embodiments, the controller 206 is not necessarily able to determine when the torches 200 are burning and when they are not. In some of these embodiments, the pump 210 is activated by the controller 206 at the end of each time period Tr, regardless of whether the torches 200 are burning. If the torches 200 are not burning, and the internal reservoirs 116 of the torches 200 are already full, then the FOP 318 valves remain closed, and the pumping has no effect, even if it continues during an entire fill time Tf. In other embodiments that monitor the pressure and/or the flow rate of the fuel in the fuel plumbing system 204, 208, when the internal torch reservoirs 116 are already full of fuel 312 the pump 210 is stopped almost immediately after being started. In essence, the pressure and/or flow sensors in these embodiments enable the controller 206 to indirectly determine whether at least one of the torches 200 is burning.

In other embodiments, the controller 206 is able to directly determine when the torches 200 are burning and when they are not. In some of these embodiments, a schedule of operation is provided to the controller. In other embodiments, the torches 200 are ignited and extinguished by the controller 206, for example by activating wick ignitors 320 to initiate burning and by reversing the pumping direction 216 to extinguish the torches 200, such that the controller 206 is necessarily aware of when the torches 200 are burning and when they are not. In still other embodiments, a heat sensor 322 in communication with the controller 206 is provided proximate the wick 112 of at least one of the torches 200, thereby enabling the controller 206 to detect whether and when the torch 200 is burning. In some of these embodiments where heat sensors 322 are provided with a plurality of the torches 200, the outputs of the heat sensors 322 are combined, so that only a single interconnection with the controller 206 is required. For example, the outputs of the heat sensors 322 can be combined into a logical "OR" output, such that the combined output toggles between an idle state in which none of the torches 200 is burning and no refilling is required, and an active state in which at least one of the torches 200 is burning and requires periodic refilling.

The provision of heat sensors 322 in embodiments can also improve the safety of the system, in that, if a leak in the plumbing system 204, 208 allows the fuel to drain out of the local torch reservoirs 116, thereby unexpectedly extinguishing the torches 200, the controller 206 will cease to initiate any additional refueling cycles 500 and, in embodiments, will issue an alarm to a user indicating that a failure and potential fuel leak has occurred.

Providing at least one heat sensor 322 proximate the wick 112 of a torch 200 also enables the controller 206, in embodiments, to determine the "wick burning time," Tw, during which the torches 200 will continue burn after their local reservoirs 116 are emptied by reverse flow, so that the torches can be extinguished at a desired time Te by emptying their local fuel reservoirs 116 at a time Te−Tw.

Figure 8:
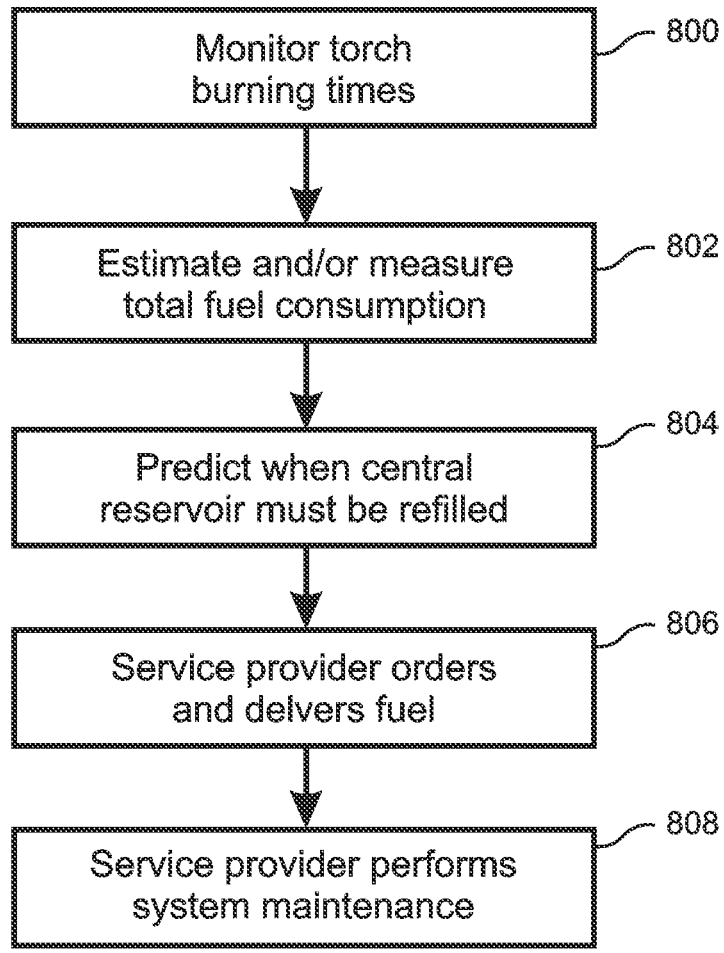
FIG. 8 is a flow diagram that illustrates monitoring of fuel consumption, delivery of fuel, and performance of maintenance by a service provider.

With reference to FIG. 8, embodiments of the present invention include monitoring a total burning time 800 of the torches, measuring and/or estimating a total fuel consumption of the system 802, and predicting when the central fuel reservoir 210 will require refilling 804. The total burning time 800 of the torches 200 can be reported directly by the heat sensors 322 or determined based on a history of igniting and extinguishing the torches by the controller 206, or on a burning schedule provided by a user. Total fuel consumption can also be estimated 802 based on measured flow rates and durations as recorded by a flow sensor 218. Some embodiments that include heat sensors 322 are able to estimate fuel consumption 802 based on burning rates 800 of the torches 200, as estimated according to temperatures recorded by the heat sensors 322, in that a higher measured temperature will indicate a more rapid consumption of fuel by the torch 200.

In embodiments that include a reservoir level sensor 220, as shown in FIGS. 2A and 2B, fuel consumption as determined from changes in the fuel contents of the central reservoir 202 can be compared with the estimated (expected) fuel consumption 802 based on total burning time 800 of the torches 200. In these embodiments, unexpected differences between the measured and calculated (anticipated) fuel consumption can be used as an indication of changes or issues that may require maintenance or repair, such as a change in the type or quality of fuel being burned, degraded wicks that may need to be replaced, failure of an FOP valve, or the existence of a fuel leak that may need to be repaired.

With continued reference to FIG. 8, in some embodiments a remote service provider automatically orders and delivers replacement fuel 806 as needed to the operator of the torch system according to the estimated and/or measured fuel consumption 802. In addition to being a convenience for the torch operator, this approach also has the added benefit of ensuring that the liquid fuel consumed by the torches 200 is consistent in its quality and properties, thereby improving the performance of the torches and reducing system maintenance. In some of these embodiments, the service provider is also able to schedule preventive maintenance 808, such as wick replacements, based on the estimated or measured burning times of the torches 200.

In various embodiments, the disclosed method includes establishing a usage pattern applicable to the torches 200, for example determining an average amount of fuel that is consumed per week or per month, and then ordering and delivering replacement fuel and/or scheduling maintenance according to the usage pattern. In some of these embodiments, the usage pattern is established according to time periods during the year. For example, typical daily or weekly fuel consumptions can be separately established for the Summer, Fall, Winter, and Spring, or for any other period or cycle.

In various embodiments where the torches 200 include remotely actuated wick ignitors 320, the wick ignitors 320 are individually operable by the controller 206, so that the controller 206 is able to stagger the ignition of the torches 200. For example, in some embodiments, if the controller 206 is commanded to ignite all of the torches 200, it applies an ignition voltage to the wick ignitors 320 sequentially rather than simultaneously. This approach of staggering the wick ignitions 320 ensures that the power applied by the controller 206 to the wick ignitors 320 never exceeds the power required to ignite a single torch 200, thereby greatly reducing the power and current capacity that is required by the torch ignition system.

It should be note that, according to the present invention, while the torches 200 are interconnected with each other and with the central reservoir 202 by the fuel plumbing system 204, 208, the torches 200 in the disclosed system are otherwise structurally independent and separate from each other and from the central reservoir 202, although embodiments further include wires that convey signals and/or electrical power between devices, such as heat sensors 322 and/or wick ignitors 320, that are deployed with the torches 200, and the central controller 206.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

What is claimed is:

1. An automatically refueled liquid fuel burning torch system comprising:
    a central fuel reservoir configured to contain a combustible liquid fuel;
    at least one torch:
        each of said torches having a substantially enclosed interior and a local fuel reservoir located within said enclosed interior, the local fuel reservoir being configured to contain a local quantity of said fuel;
        each of said torches further comprising a combustion area exterior to the torch and configured for burning said fuel when drawn by a wick from said local quantity into said combustion area; and
        each of said torches having a fuel overfill prevention valve (FOP valve) installed therein, said FOP valve being configured to be mechanically controlled by a local fuel level of the local quantity of fuel within the enclosed interior, and to be automatically closed when the local fuel level reaches a determined maximum height within the enclosed interior, thereby preventing further ingress of fuel into the local fuel reservoir;
    a fuel plumbing system configured to convey said fuel from the central fuel reservoir to the local reservoirs of each of said torches;
    a refueling system comprising a pump, an electronically actuated shutoff valve, and a controller, the controller being able to actuate the pump and the shutoff valve, the controller being configured to:
    A) initiate a refueling period by activating said pump and opening said shutoff valve, thereby establishing a fuel pressure within the fuel plumbing system that is above ambient pressure, and thereby causing fuel to flow from the fuel plumbing system into each of said torches until the local fuel level within each of said torches reaches the determined maximum height and the FOP valve within each of the torches is closed;
    B) terminate the refueling cycle by stopping the pump and closing the shutoff valve, the shutoff valve thereby preventing fuel from flowing out from the fuel plumbing system;
    C) wait for a pre-calibrated time Tr during which the local fuel levels in the torches are predicted to fall from the determined maximum height to a determined minimum height due to burning of the fuel by the torches; and
    D) repeat steps A) through C);
    wherein the torches do not include fuel level sensors or remotely controlled electronic valves;
    and wherein the torches, while interconnected with each other and with the central reservoir by the fuel plumbing system, are otherwise structurally independent and separate from each other and from the central reservoir.

2. The system of claim 1, wherein the at least one torch comprises a plurality of the torches.

3. The system of claim 1, wherein in step B) the controller is configured to terminate the refueling period at a pre-calibrated time Tf that is required for local fuel levels in all of the torches to rise from the minimum height to the maximum height.

4. The system of claim 1, wherein the system further comprises at least one of:
    a pressure sensor in communication with the controller and configured to measure a pressure of the fuel within the fuel plumbing system; and
    a flow rate sensor in communication with the controller and configured to measure a rate of flow of fuel from the central reservoir to the torches;
    and wherein, in step B), the controller is configured to terminate the refueling period when a pressure increase is detected in the fuel plumbing system indicating a backpressure due to closing of all of the FOP valves, and/or a cessation is detected of the flow of the fuel from the central reservoir to the torches.

5. The system of claim 4, wherein the controller is configured to terminate the refueling period and to suspend any subsequent refueling periods if no backpressure or cessation of the flow of the fuel is detected and the refueling cycle has continued beyond a predicted refueling time Tf by more than a maximum "delta" time interval.

6. The system of claim 5, wherein the controller is further configured to issue an alarm indicating that a fuel leakage may have occurred if no backpressure or cessation of the flow of the fuel is detected and the refueling period has continued beyond the predicted refueling cycle time Tf by more than the maximum "delta" time interval.

7. The system of claim 5, wherein if a backpressure or cessation of the flow of the fuel is detected at a time Tf' that is either less than Tf or exceeds Tf by an amount that is less than the maximum "delta" time interval, the controller is configured to adjust Tf to be equal to Tf'.

8. The system of claim 1, wherein the controller is configured to continuously repeat steps A) through C) regardless of whether any of the torches are burning or not.

9. The system of claim 1, wherein the controller is configured to perform steps A) through C) only when the torches are burning.

10. The system of claim 9, wherein a burning schedule is provided to the controller.

11. The system of claim 9, wherein the torches are ignited and extinguished by the controller.

12. The system of claim 11, wherein each of the torches includes an electronic ignitor that can be activated by the controller.

13. The system of claim 12, wherein the at least one torch includes a plurality of torches, and wherein the controller is configured to ignite the torches sequentially, so that an igniting voltage is never applied to two of the torches at the same time.

14. The system of claim 1, wherein the controller is able to extinguish the torches by reversing a direction of flow of the pumping system, thereby draining the fuel out of the local fuel reservoirs of the torches, the torches being thereby extinguished after a time Tw during which residual fuel contained in the wicks of the torches is exhausted.

15. The system of claim 1, further comprising a heat sensor located proximate the wick of a first of the torches and in communication with the controller, said heat sensor being configured to transmit a signal to the controller indicating that one of the torches is burning fuel.

16. The system of claim 15, wherein the at least one torch includes a plurality of the torches having heat sensors located proximate their wicks, and wherein outputs of the torches are combined into a single combined output in communication with the controller, said combined output being configured to toggle between an idle state in which none of the torches is burning and an active state in which at least one of the torches is burning.

17. The system of claim 15, wherein:
the controller is able to extinguish the first torch by reversing a direction of flow of the pumping system, thereby draining the fuel out of the local fuel reservoir of the first torch, the first torch being thereby extinguished after a time Tw during which residual fuel contained in the wick of the first torch is exhausted;
the controller is able to determine Tw by monitoring the heat sensor; and
the controller is subsequently able to extinguish the first torch at a desired time Te by draining the fuel out of the local fuel reservoir of the first torch at a time Te−Tw.

18. A method of maintaining an automatically refueled liquid fuel burning torch system, the method comprising:
providing an automatically refueled liquid fuel burning torch system according to claim 1;
estimating a total burning time of the torches of the torch system;
according to the estimated burning time, predicting a refueling date when the central reservoir of the torch system will require refilling with liquid fuel; and
delivering liquid fuel to an operator of the torch system in advance of the refueling date.

19. The method of claim 18, wherein the torch system is a torch system according to claim 15, and wherein estimating a total burning time of the torches comprises determining a burning time of the torches according to the signals transmitted by the heat sensor.

20. The method of claim 19, wherein predicting the refueling date includes determining a usage pattern of the torches according to the signals transmitted by the heat sensor.

* * * * *